(12) United States Patent
Takada et al.

(10) Patent No.: US 10,110,377 B2
(45) Date of Patent: Oct. 23, 2018

(54) COMMUNICATION SYSTEM AND KEY INFORMATION SHARING METHOD

(71) Applicants: NATIONAL UNIVERSITY CORPORATION NAGOYA UNIVERSITY, Nagoya-shi, Aichi (JP); AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hiroaki Takada, Nagoya (JP); Ryo Kurachi, Nagoya (JP); Naoki Adachi, Yokkaichi (JP)

(73) Assignees: NATIONAL UNIVERSITY CORPORATION NAGOYA UNIVERSITY, Nagoya-shi (JP); AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 119 days.

(21) Appl. No.: 15/319,098

(22) PCT Filed: Jun. 22, 2015

(86) PCT No.: PCT/JP2015/067865
§ 371 (c)(1),
(2) Date: Dec. 15, 2016

(87) PCT Pub. No.: WO2016/002559
PCT Pub. Date: Jan. 7, 2016

(65) Prior Publication Data
US 2017/0149562 A1     May 25, 2017

(30) Foreign Application Priority Data

Jul. 4, 2014  (JP) .................................. 2014-139074

(51) Int. Cl.
H04L 9/32     (2006.01)
H04L 9/08     (2006.01)
(Continued)

(52) U.S. Cl.
CPC .............. H04L 9/08 (2013.01); H04L 9/0894 (2013.01); H04L 9/3228 (2013.01);
(Continued)

(58) Field of Classification Search
CPC . H04L 9/32; H04L 9/08; H04L 9/0894; H04L 9/3228; H04L 9/3236;
(Continued)

(56) References Cited

U.S. PATENT DOCUMENTS 7,409,526 B1* 8/2008 Ng ........................ H04L 9/0894
                                        711/216
8,775,820 B1* 7/2014 Freeburne ........... H04L 63/0838
                                        713/184
(Continued)

FOREIGN PATENT DOCUMENTS

CN      103010127 A     4/2013
JP      2007-505408 A   3/2007
(Continued)

OTHER PUBLICATIONS

Sep. 8, 2015 Search Report issued in International Patent Application No. PCT/JP2015/067865.
(Continued)

Primary Examiner — Jayesh M Jhaveri
(74) Attorney, Agent, or Firm — Oliff PLC

(57) ABSTRACT

A communication system and key information sharing method which allows first and second communication
(Continued)

devices to share key information and perform cryptograph processing. The monitoring device calculates hash value based on copy data of storage content of an ECU, and transmits a part to the ECU as confirmation information. The ECU further extracts a part from a value, obtained by removing confirmation information from hash value calculated by the ECU, and transmits part to the monitoring device as response information when the received confirmation information is included in the hash value calculated by the ECU. The monitoring device determines whether the received response information is included in hash value of the monitoring device or not. The ECU and monitoring device each use residual value, obtained by removing confirmation information and response information from hash value calculated by the ECU or monitoring device, for following cryptograph processing as a shared key.

12 Claims, 14 Drawing Sheets

(51) Int. Cl.
 H04L 29/06 (2006.01)
 H04L 12/40 (2006.01)
(52) U.S. Cl.
 CPC .......... *H04L 9/3236* (2013.01); *H04L 9/3239* (2013.01); *H04L 63/06* (2013.01); *H04L 63/083* (2013.01); *H04L 63/0838* (2013.01); *H04L 2012/40273* (2013.01); *H04L 2209/38* (2013.01); *H04L 2209/84* (2013.01)

(58) Field of Classification Search
 CPC ............... H04L 9/3239; H04L 63/06; H04L 2012/40273; H04L 2209/38; H04L 2209/84; H04L 63/083; H04L 63/0838
 See application file for complete search history.

(56) References Cited

U.S. PATENT DOCUMENTS

| 2005/0166263 | A1 | 7/2005 | Nanopoulos et al. |
| 2006/0093144 | A1 | 5/2006 | Reinelt |
| 2007/0277043 | A1* | 11/2007 | Sorensen .............. H04L 9/0643 713/180 |
| 2010/0046749 | A1* | 2/2010 | Hatano .................. H04L 9/088 380/44 |
| 2012/0093312 | A1 | 4/2012 | Gammel et al. |
| 2017/0318008 | A1* | 11/2017 | Mead .................. H04L 63/1466 |

FOREIGN PATENT DOCUMENTS

| JP | 2008-193575 A | 8/2008 |
| JP | 2009-009541 A | 1/2009 |
| JP | 2009-284086 A | 12/2009 |

OTHER PUBLICATIONS

Tsujii, Shigeo et al., "Cryptography and Information Security", 1st Edition, 4th Print, Shokodo Co., Ltd., Feb. 20, 1996, pp. 72-73.
Ueda, Hiroshi et al., "Security Authentication System for In-Vehicle Network", SEI Technical Review, Jul. 2015, No. 187, pp. 1-5.

* cited by examiner

FIG. 5

COPY DATA

| ECU IDENTIFICATION INFORMATION | STORAGE CONTENT |
|---|---|
| ECUa | ...... |
| ECUb | ...... |
| ⋮ | ⋮ |

FIG. 14

PRIME NUMBER TABLE

| START BIT OF CONFIRMATION INFORMATION | PRIME NUMBER |
|---|---|
| 0 | PRIME NUMBER 0 |
| 1 | PRIME NUMBER 1 |
| 2 | PRIME NUMBER 2 |
| ⋮ | ⋮ |
| 159 | PRIME NUMBER 159 |

COMMUNICATION SYSTEM AND KEY INFORMATION SHARING METHOD

CROSS-REFERENCE TO RELATED APPLICATIONS

This application is the national phase under 35 U.S.C. § 371 of PCT International Application No. PCT/JP2015/067865 which has an International filing date of Jun. 22, 2015 and designated the United States of America.

FIELD

The present disclosure relates to a communication system and a key information sharing method, which allow a first communication device and a second communication device to share key information to be used for cryptograph processing.

BACKGROUND

In a conventional communication system in which a plurality of communication devices communicate with each other via a network, communication applied with a message authenticator, encryption of data, or the like is made in order to enhance the reliability of the communication.

For performing processing such as encryption, the communication devices for making communication need to hold a shared key.

Japanese Patent Laid-Open Publication No. 2009-284086 suggests a cryptographic key updating system which updates a cryptographic key to be used in a shared key cryptographic method. In this cryptographic key updating system, an electronic key and an on-vehicle device preliminarily share secret information with each other, and a hash function is repeatedly applied to the secret information so that a common cryptographic key is obtained as the result. In the process of updating a cryptographic key, a result obtained by applying a hash function the number of times, which is smaller than a previous repeat count by 1, is regarded as a cryptographic key.

SUMMARY

The present inventors have invented a communication system, which can detect illegal falsification to a program, data and the like stored in a storage unit of a communication device, and has already filed a patent application for such a system. It is also desired for the present communication system to realize communication applied with a message authenticator, encryption of data to be transmitted and received between communication devices sharing key information, or the like in order to improve the safety, reliability and the like of the communication.

The present disclosure has been made in view of such a situation, and the object thereof is to provide a communication system and a key information sharing method, which allow a first communication device and a second communication device to share key information for performing cryptograph processing.

A communication system according to an aspect of the present disclosure is a communication system in which a first communication device and a second communication device having a second storage unit share key information to be used for cryptograph processing, the first communication device comprising: a first storage unit which stores storage content of the second storage unit of the second communication device; a first hash value calculation unit calculating a first hash value based on storage content of the first storage unit; a first part extraction unit extracting a first part from the first hash value calculated by the first hash value calculation unit; and a first part transmission unit transmitting the first part extracted by the first part extraction unit to the second communication device, the second communication device comprising: a second hash value calculation unit calculating a second hash value based on storage content of the second storage unit; a first part reception unit receiving the first part from the first communication device; a second hash value determination unit determining whether the first part received at the first part reception unit coincides with a part of the second hash value calculated by the second hash value calculation unit or not; a second part extraction unit extracting a second part, which is different from the first part, from the second hash value calculated by the second hash value calculation unit if the second hash value determination unit determines that the first part coincides with a part of the second hash value calculated by the second hash value calculation unit; a second part transmission unit transmitting the second part extracted by the extraction unit to the first communication device; and a second generation unit generating the key information on the basis of a residual value obtained by removing the first part and the second part from the second hash value calculated by the second hash value calculation unit, and the first communication device further comprising: a second part reception unit receiving the second part from the second communication device; a first hash value determination unit determining whether the second part received at the second part reception unit coincides with a part of the first hash value calculated by the first hash value calculation unit or not; and a first generation unit generating the key information on the basis of a residual value, which is obtained by removing the first part and the second part from the first hash value calculated by the first hash value calculation unit, if the first hash value determination unit determines that the second part coincides with a part of the first hash value calculated by the first hash value calculation unit.

Moreover, the communication system according to another aspect of the present disclosure is wherein the first generation unit of the first communication device and the second generation unit of the second communication device each regard the residual value as key information.

Moreover, the communication system according to another aspect of the present disclosure is wherein the first communication device comprises: a first secret value generation unit generating a first secret value; a first public value generation unit generating a first public value on the basis of the first secret value generated by the first secret value generation unit and the residual value; a first public value transmission unit transmitting the first public value generated by the first public value generation unit to the second communication device; and a second public value reception unit receiving a second public value from the second communication device, the first generation unit of the first communication device is constructed to generate the key information on the basis of the second public value received at the second public value reception unit and the first secret value, the second communication device comprises: a second secret value generation unit generating a second secret value; a second public value generation unit generating the second public value on the basis of the second secret value generated by the second secret value generation unit and the residual value; a second public value transmission unit transmitting the second public value generated by the second public value generation unit to the first communication device; and a first public value reception unit receiving the first public value from the first communication device, and the second generation unit of the second communication device is constructed to generate the key information on the basis of the first public value received at the first public value reception unit and the second secret value.

Moreover, the communication system according to another aspect of the present disclosure is wherein the first communication device and the second communication device each comprise: a prime number table having a plurality of prime numbers stored therein; and a prime number selection unit selecting a prime number from the prime number table, the first public value generation unit of the first communication device is constructed to generate the first public value using the prime number selected by the prime number selection unit, and the second public value generation unit of the second communication device is constructed to generate the second public value using the prime number selected by the prime number selection unit.

Moreover, the communication system according to another aspect of the present disclosure is wherein the first secret value generation unit and the second secret value generation unit are constructed to generate the first secret value and the second secret value on the basis of a random number.

Moreover, the communication system according to another aspect of the present disclosure is wherein the first communication device comprises: a hash value calculation information generation unit generating information to be used for hash value calculation; and a hash value calculation information transmission unit transmitting the hash value calculation information generated by the hash value calculation information generation unit to the second communication device, the first hash value calculation unit is constructed to calculate the first hash value using the hash value calculation information generated by the hash value calculation information generation unit, the second communication device comprises a hash value calculation information reception unit receiving the hash value calculation information from the first communication device, and the second hash value calculation unit is constructed to calculate the second hash value using the hash value calculation information received at the hash value calculation information reception unit.

Moreover, the communication system according to another aspect of the present disclosure is wherein the hash value calculation information generated by the hash value calculation information generation unit includes a random number.

Moreover, the communication system according to another aspect of the present disclosure is wherein the hash value calculation information generated by the hash value calculation information generation unit includes information which defines an area in the second storage unit of the second communication device, the second communication device being the object of hash value calculation.

Moreover, the communication system according to another aspect of the present disclosure is wherein the first communication device comprises: a first hash value storage unit for storing the first hash value calculated by the first hash value calculation unit; and a first update processing unit performing processing to update the key information on the basis of the first hash value stored in the first hash value storage unit.

Moreover, the communication system according to another aspect of the present disclosure is wherein the first update processing unit extracts the first part from the first hash value stored in the first hash value storage unit by the first extraction unit of the first communication device, transmits the extracted first part from the first part transmission unit to the second communication device, and receives the second part from the second communication device at the second part reception unit to update the residual value.

Moreover, the communication system according to another aspect of the present disclosure is wherein the second communication device comprises: a second hash value storage unit for storing the second hash value calculated by the second hash value calculation unit; and a second update processing unit extracting the second part by the second extraction unit of the second communication device on the basis of the first part transmitted in update processing by the first update processing unit of the first communication device, transmitting the extracted second part from the second part transmission unit to the first communication device, and updating the residual value on the basis of the first part and the second part.

Moreover, a key information sharing method according to another aspect of the present disclosure is a key information sharing method which allows a first communication device and a second communication device having a second storage unit to share key information to be used for cryptograph processing, comprising: copying storage content of the second storage unit of the second communication device into the first communication device; calculating, by the first communication device, a first hash value based on the copied storage content; extracting a first part from the first hash value; transmitting the first part to the second communication device; calculating, by the second communication device, a second hash value based on storage content of the second storage unit; receiving, at the second communication device, the first part from the first communication device; determining whether the first part coincides with a part of the second hash value or not; extracting a second part, which is different from the first part, from the second hash value if determined that the first part coincides with a part of the second hash value; transmitting the second part to the first communication device; generating key information according to a residual value obtained by removing the first part and the second part from the second hash value; receiving, at the first communication device, the second part from the second communication device; determining whether the second part coincides with a part of the first hash value or not; and generating key information according to a residual value obtained by removing the first part and the second part from the first hash value, if determined that the second part coincides with a part of the first hash value.

In an aspect of the present disclosure, a first communication device and a second communication device share key information. The first communication device preliminarily stores a copy of the storage content of a second storage unit of the second communication device, and a has first hash value calculation unit for calculating a first hash value on the basis of the copied storage content. The second communication device has a second hash value calculation unit for calculating a second hash value on the basis of the storage content of the second storage unit of the second communication device itself. It is to be noted that the first hash value calculation unit and the second hash value calculation unit are configured to perform the same arithmetic operation, so that hash values to be calculated are the same if information to be inputted are the same.

The first communication device calculates a first hash value based on the copied storage content, extracts a part thereof as a first part, and transmits the first part to the second communication device. The second communication device compares the first part of the first hash value, which is received from the first communication device, with a second hash value calculated on the basis of storage content of the second communication device itself, and determines whether the received first part coincides with a part of the second hash value of the second communication device itself or not. If the second hash values do not coincide, which means that the storage content of the second communication device does not coincide with the copied storage content of the first communication device, it can be determined that there is a possibility that illegal falsification has been made to the storage content of the second communication device. If the second hash values coincide, the second communication device extracts a second part, which is different from the received first part, from the second hash value calculated by the second communication device itself, and transmits the second part to the first communication device.

The first communication device compares the second part of the second hash value, which is received from the second communication device, with the first hash value calculated by the first communication device itself, and determines whether the received second part coincides with a part of the first hash value of the first communication device itself or not. If the first hash values do not coincide, which means that the storage content of the second communication device does not coincide with the copied storage content of the first communication device, it can be determined that there is a possibility that illegal falsification has been made to the storage content of the second communication device. If the first hash values coincide, which means that the first hash value calculated by the first communication device coincides with the second hash value calculated by the second communication device, it can be determined that illegal falsification has not been made to the storage content.

Accordingly, the first communication device and the second communication device each calculate a residual value by removing the first part, which is extracted by the first communication device, and the second part, which is extracted by the second communication device, from the first hash value or the second hash value calculated by the first communication device or the second communication device itself, and generates key information on the basis of the residual value.

This allows the first communication device and the second communication device to simultaneously perform processing to detect illegal falsification to the storage content of the second storage unit of the second communication device, and processing to decide key information to be used for cryptograph processing.

Moreover, in another aspect of the present disclosure, the first communication device and the second communication device perform cryptograph processing using the calculated residual value as key information. It is to be noted that the whole of a residual value may be used as key information, or a part of a residual value may be used as key information. This allows the first communication device and the second communication device to acquire key information at the same time as termination of illegal falsification detection processing.

Moreover, in another aspect of the present disclosure, the first communication device and the second communication device each generate a secret value using a random number, for example, generate a public value on the basis of the secret value and the residual value, transmit the public value to each other, and generate key information on the basis of the secret value of the first communication device or the second communication device itself and the received public value.

For example, the first communication device and the second communication device preliminarily store a common prime number table. A plurality of prime numbers are stored in the prime number table, and the first communication device and the second communication device each select a prime number from the prime number table and generate a public value using the selected prime number.

These can enhance the confidentiality of key information shared by the first communication device and the second communication device.

Moreover, in another aspect of the present disclosure, the first communication device generates hash value calculation information and transmits the hash value calculation information to the second communication device, prior to calculation of a hash value. For example, the hash value calculation information can be a random number. As another example, the hash value calculation information can be information which defines an area in the second storage unit, which is the object of hash value calculation. The first communication device and the second communication device each calculate a hash value based on the storage content, using the hash value calculation information.

These complicate hash value calculation, and therefore the reliability of detection of illegal falsification to the storage content can be improved, and the reliability of key information to be shared can be improved.

Moreover, in another aspect of the present disclosure, the first communication device and the second communication device each store the calculated hash value. The first communication device performs key information update processing at a proper timing such as when a predetermined period of time elapses after key information is generated, for example. In the update processing, the processing load can be reduced by using the calculated hash value which has been preliminarily stored. The first communication device starts key information update processing by extracting a first part, which is different from a part used previously, from the first hash value, which has been preliminarily stored, and transmitting the first part to the second communication device. The second communication device extracts a second part on the basis of the received first part and the second hash value, which has been preliminarily stored, and transmits the second part to the first communication device. This allows the first communication device and the second communication device to each calculate a residual value on the basis of a new first part and a new second part and to update key information.

With an aspect of the present disclosure, the first communication device and the second communication device can share key information by utilizing processing to detect illegal falsification to the storage content of the storage unit of the second communication device. The first communication device and the second communication device can make highly reliable communication by performing cryptograph processing using shared key information.

The above and further objects and features will more fully be apparent from the following detailed description with accompanying drawings.

BRIEF DESCRIPTION OF THE DRAWINGS

FIG. 5 is a schematic view for explaining the structure of copy data stored in a storage unit of a monitoring device.

FIG. 14 is a schematic view illustrating an example of a prime number table.

DETAILED DESCRIPTION

Embodiment 1

<System Configuration>

Figure 1:
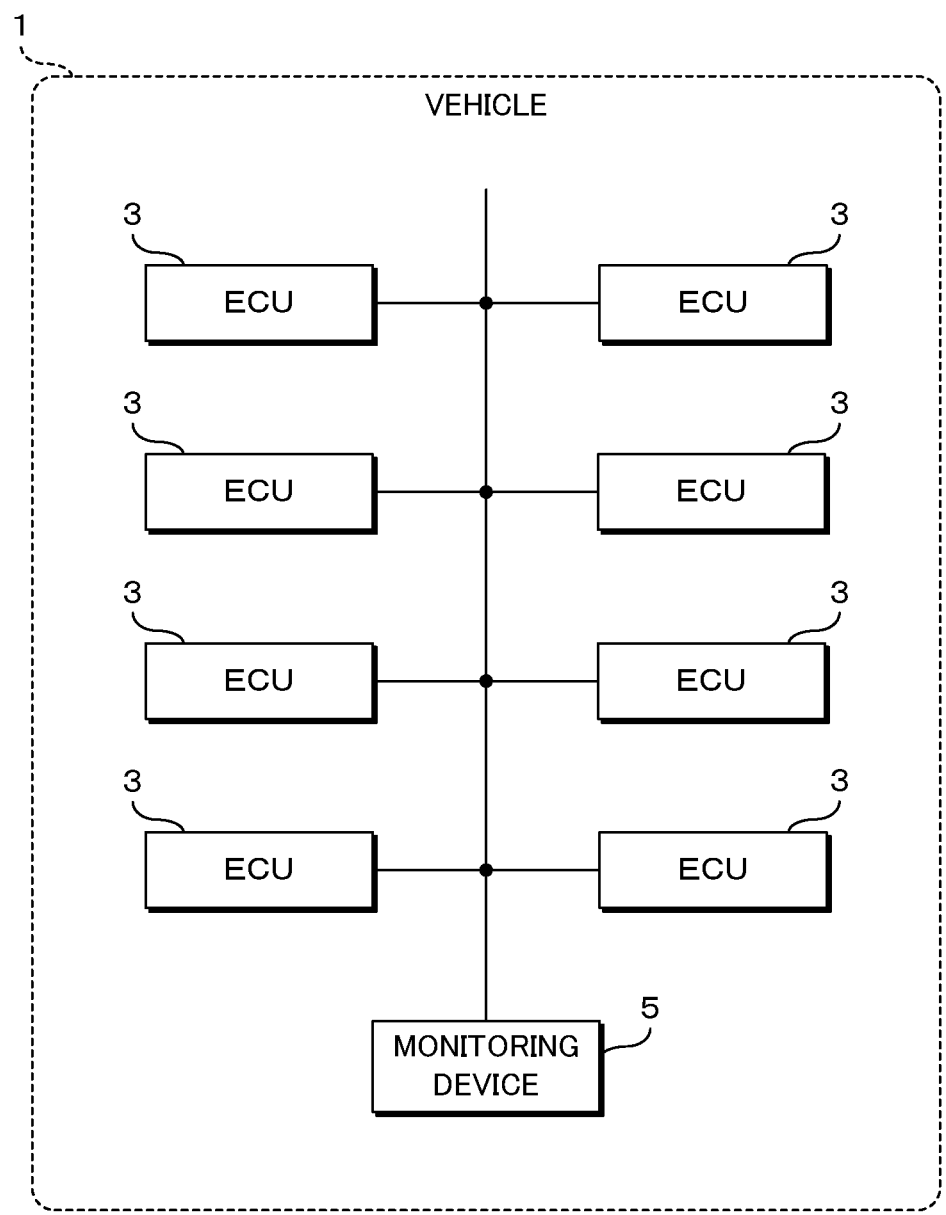
FIG. 1 is a schematic view illustrating the configuration of a communication system according to this embodiment.

FIG. 1 is a schematic view illustrating the configuration of a communication system according to this embodiment. A communication system according to this embodiment is composed of; a plurality of ECUs (Electronic Control Units) 3 mounted on a vehicle 1; and a monitoring device 5. The ECUs 3 and the monitoring device 5 are connected with each other via a common communication line laid on the vehicle 1, and can transmit and receive data to and from each other. In this embodiment, the communication line is constituted of a CAN (Controller Area Network) bus, and the ECUs 3 and the monitoring device 5 make communication according to a CAN protocol. Each ECU 3 may be one of various electronic control devices such as: an engine ECU for controlling the engine of the vehicle 1; a body ECU for controlling electrical equipment of the vehicle body; an ABS-ECU for making control related to ABS (Antilock Brake System); or an airbag ECU for controlling an airbag of the vehicle 1, for example. The monitoring device 5 is a device for monitoring illegal falsification to programs and data stored in the ECUs 3, illegal data transmission to the in-vehicle network, and the like. The monitoring device 5 may be provided as a device dedicated to monitoring, may have a configuration with a monitoring function added to a device such as a gateway, for example, or may have a configuration with a monitoring function added to any one of the ECUs 3, for example.

Figure 2:
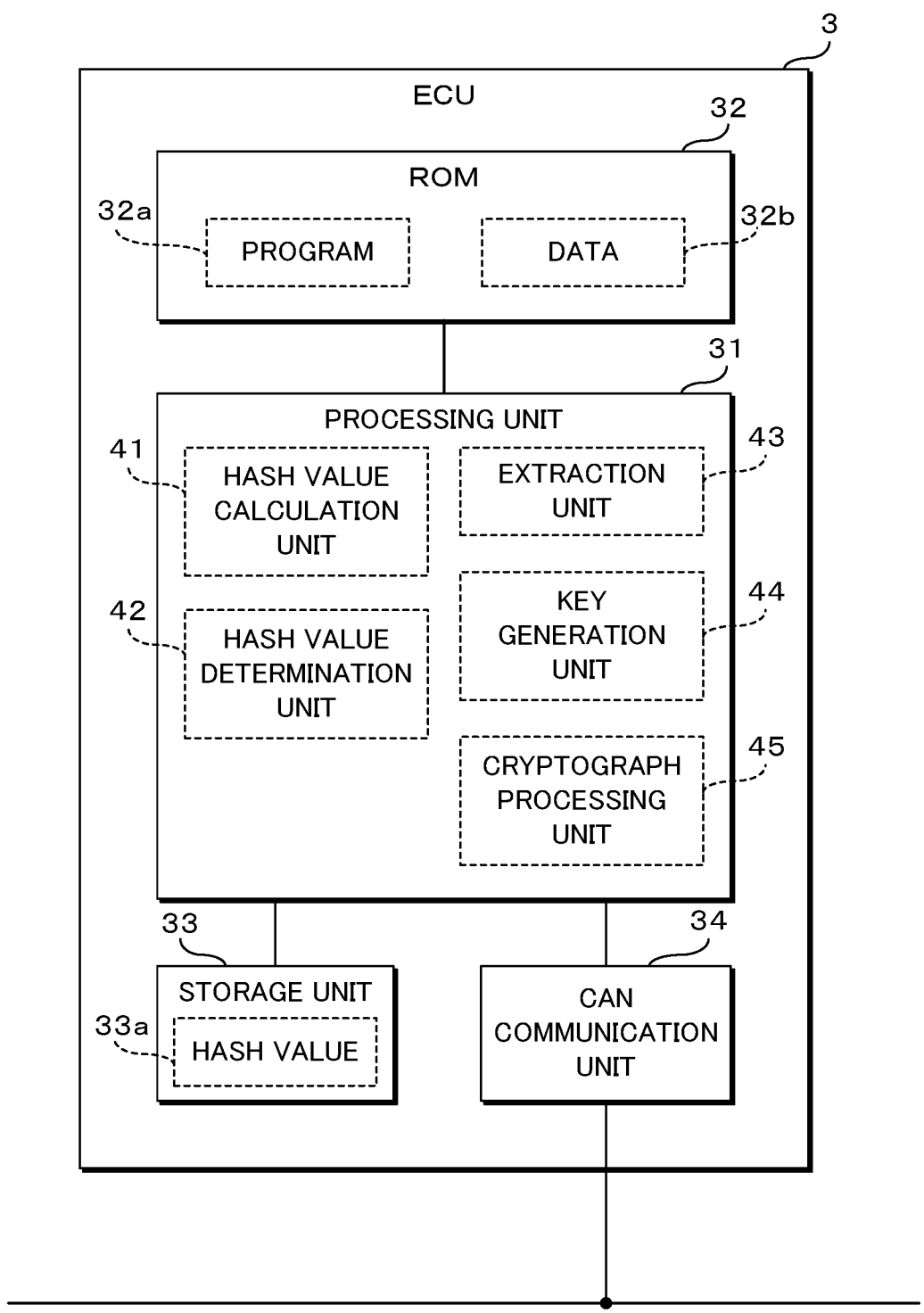
FIG. 2 is a block diagram illustrating the configuration of an ECU.

FIG. 2 is a block diagram illustrating the configuration of an ECU 3. It is to be noted that FIG. 2 extracts and illustrates blocks related to communication, fraud detection and the like, regarding a plurality of ECUs 3 provided on the vehicle 1. The blocks are common to the ECUs 3. An ECU 3 according to this embodiment is composed of a processing unit 31, a ROM (Read Only Memory) 32, a storage unit 33, a CAN communication unit 34 and the like. The processing unit 31 is constituted of an arithmetic processing device such as a CPU (Central Processing Unit) or an MPU (Micro-Processing Unit). The processing unit 31 performs various information processing, control processing or the like pertaining to the vehicle 1 by reading out and executing a program 32a stored in the ROM 32.

The ROM 32 is constituted of a nonvolatile memory element such as a mask ROM, a flash memory or an EEPROM (Electrically Erasable Programmable ROM). The ROM 32 stores the program 32a to be executed by the processing unit 31, and various data 32b to be used for processing performed by the program 32a. It is to be noted that a program 32a and data 32b stored in a ROM 32 vary by ECU 3. It is to be assumed that data rewrite to a ROM 32 is not performed in processing by the processing unit 31 in this embodiment even when the ROM 32 is constituted of a data rewritable memory element such as a flash memory.

The storage unit 33 is constituted of a data rewritable memory element such as a flash memory or an EEPROM. It is to be noted that the storage unit 33 may be constituted of a volatile memory element such as a SRAM (Static Random Access Memory) or a DRAM (Dynamic Random Access Memory). The storage unit 33 stores various data generated in processing by the processing unit 31. Moreover, in this embodiment, the storage unit 33 stores a hash value 33a calculated in processing by the processing unit 31.

The CAN communication unit 34 communicates with another ECU 3 or the monitoring device 5 via the CAN bus according to the CAN communication protocol. The CAN communication unit 34 transmits information to another ECU 3 or the monitoring device 5 by converting transmission information, which is given from the processing unit 31, into a transmission signal according to the CAN communication protocol and outputting the signal obtained by the conversion to the CAN bus. The CAN communication unit 34 acquires a signal, which is outputted from another ECU 3 or the monitoring device 5, by sampling the electric potential of the CAN bus, receives information by converting the signal into binary information according to the CAN communication protocol, and gives the received information to the processing unit 31.

The processing unit 31 of the ECU 3 in this embodiment is provided with a hash value calculation unit 41, a hash value determination unit 42, an extraction unit 43, a key generation unit 44, a cryptograph processing unit 45 and the like. The units from the hash value calculation unit 41 to the cryptograph processing unit 45 may be constructed as hardware functional blocks, or may be constructed as software functional blocks. Details of processing to be performed by the units from the hash value calculation unit 41 to the cryptograph processing unit 45 will be described later.

Figure 3:
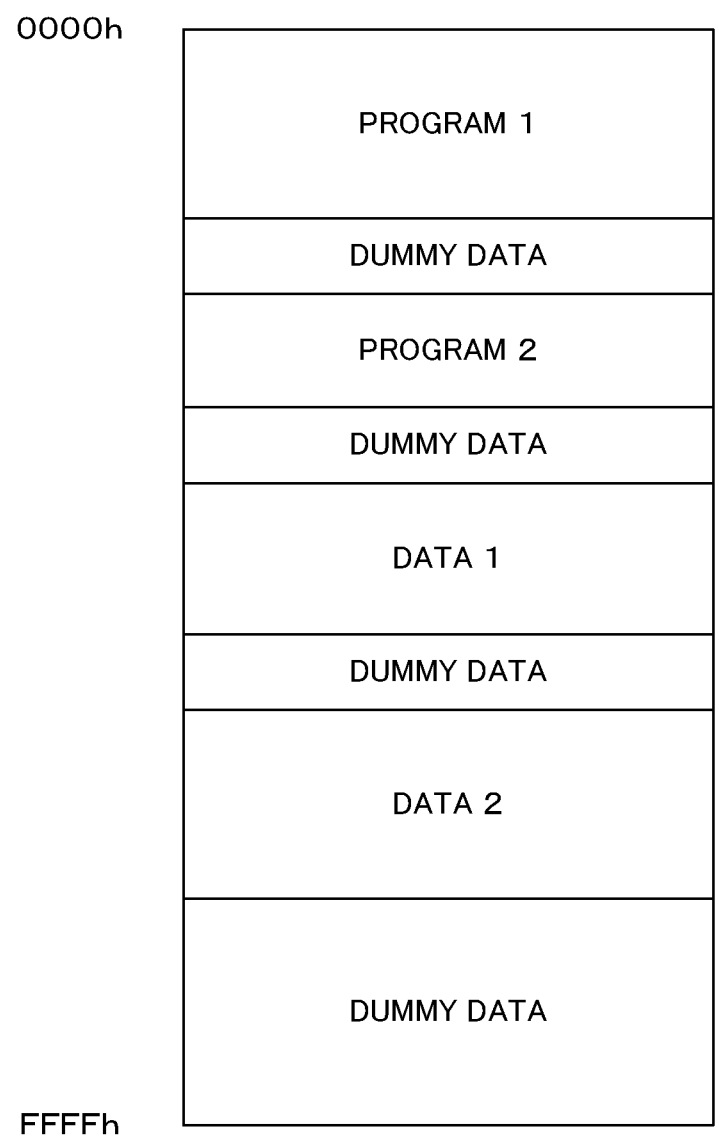
FIG. 3 is a schematic view illustrating the configuration of a ROM of an ECU.

FIG. 3 is a schematic view illustrating the configuration of the ROM 32 of an ECU 3. In the illustrated example, the ROM 32 has a storage area having addresses represented as 0000h-FFFFh. The ROM 32 stores two programs 32a (illustrated as Program 1 and Program 2 in FIG. 3) to be executed by the processing unit 31, and two kinds of data (Data 1 and Data 2) to be respectively used for execution of the respective programs. The ROM 32 stores Program 1, Program 2, Data 1 and Data 2 in this order from the head side of the addresses, and further stores dummy data in storage areas therebetween and in a storage area at the tale side of the addresses.

Dummy data may be any value, and a randomly decided value can be stored, for example. Dummy data is written in the entire surplus area of the ROM 32. That is, some data is stored in the entire storage area of the ROM 32. This can prevent an illegal program being stored in a surplus area of the ROM 32 and illegal processing from being performed. It is also possible to complicate compression of the program 32*a* and data 32*b* stored in the ROM 32.

Figure 4:
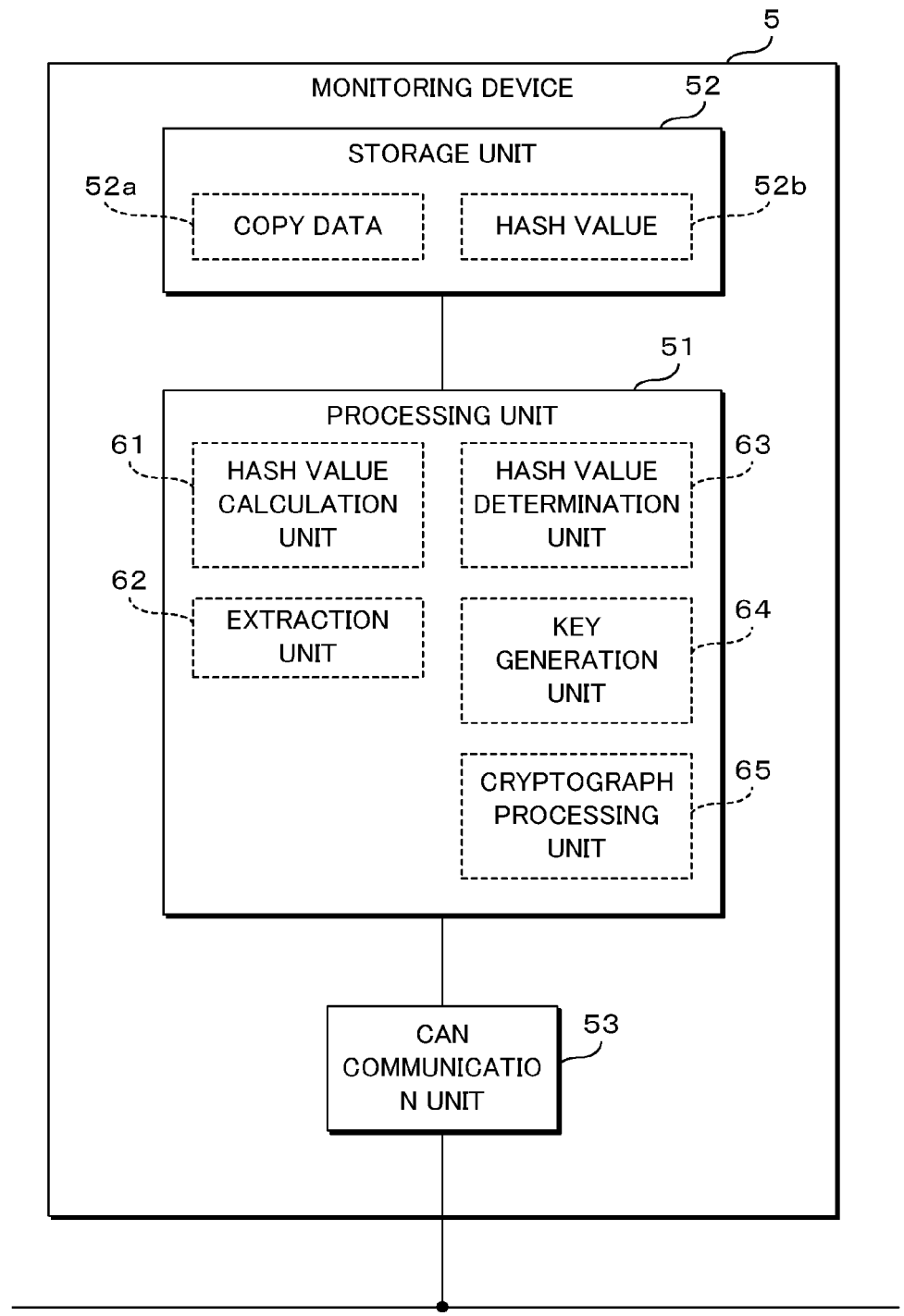
FIG. 4 is a block diagram illustrating the configuration of a monitoring device.

FIG. 4 is a block diagram illustrating the configuration of the monitoring device 5. The monitoring device 5 is composed of a processing unit 51, a storage unit 52, a CAN communication unit 53 and the like. The processing unit 51 is constituted of an arithmetic processing device such as a CPU or an MPU, and performs processing to monitor the behavior, communication and the like of the ECUs 3 of the vehicle 1 by reading out and executing a program stored in the storage unit 52.

The storage unit 52 is constituted of a data-rewritable nonvolatile memory element such as a flash memory or an EEPROM. The storage unit 52 in this embodiment stores copy data 52*a*, which is a copy of the storage content of the ROM 32 of each ECU 3 mounted on the vehicle 1. The storage unit 52 also stores a hash value 52*b* calculated in processing by the processing unit 51. It is to be assumed that the storage unit 52 is resistant to an analysis from outside, i.e., tamper resistant, so that the copy data 52*a* and the hash value 52*b* are not falsified or decoded.

The CAN communication unit 53 communicates with the ECUs 3 via the CAN bus according to the CAN communication protocol. The CAN communication unit 53 transmits information to an ECU 3 by converting transmission information, which is given from the processing unit 51, into a transmission signal according to the CAN communication protocol and outputting the signal obtained by the conversion to the CAN bus. The CAN communication unit 53 acquires a signal, which is outputted from an ECU 3, by sampling the electric potential of the CAN bus, receives information by converting the signal into binary information according to the CAN communication protocol, and gives the received information to the processing unit 51.

The processing unit 51 of the monitoring device 5 in this embodiment is provided with a hash value calculation unit 61, an extraction unit 62, a hash value determination unit 63, a key generation unit 64, a cryptograph processing unit 65 and the like. The units from the hash value calculation unit 61 to the cryptograph processing unit 65 may be constructed as hardware functional blocks, or may be constructed as software functional blocks. Details of processing to be performed by the units from the hash value calculation unit 61 to the cryptograph processing unit 65 will be described later.

FIG. 5 is a schematic view for explaining the structure of the copy data 52*a* to be stored in the storage unit 52 of the monitoring device 5. The monitoring device 5 stores the same content as the storage content of the ROM 3 for all ECUs 3, which are mounted on the vehicle 1 and are the monitoring objects, as the copy data 52*a*. As the copy data 52*a*, identification information (ECU a, ECU b, . . . in FIG. 5), which is uniquely attached to each ECU 3, and storage content of the ROM 3 of each ECU 3 are stored in association with each other.

<Illegal Falsification Detection and Shared Key Generation>

In a communication system according to this embodiment, the monitoring device 5 performs processing to detect illegal falsification to each ECU 3 and processing to generate a shared key when the ignition switch of the vehicle 1 is switched from OFF state to ON state, for example. The processing is performed by one-to-one information exchange between the monitoring device 5 and one ECU 3. The monitoring device 5 performs processing in a predetermined order for a plurality of ECUs 3 mounted on the vehicle 1. When processing by the monitoring device 5 is finished, individual processing by each ECU 3 is started. The following description will explain illegal falsification detection processing and shared key generation processing to be performed between the monitoring device 5 and one ECU 3.

Figure 6:
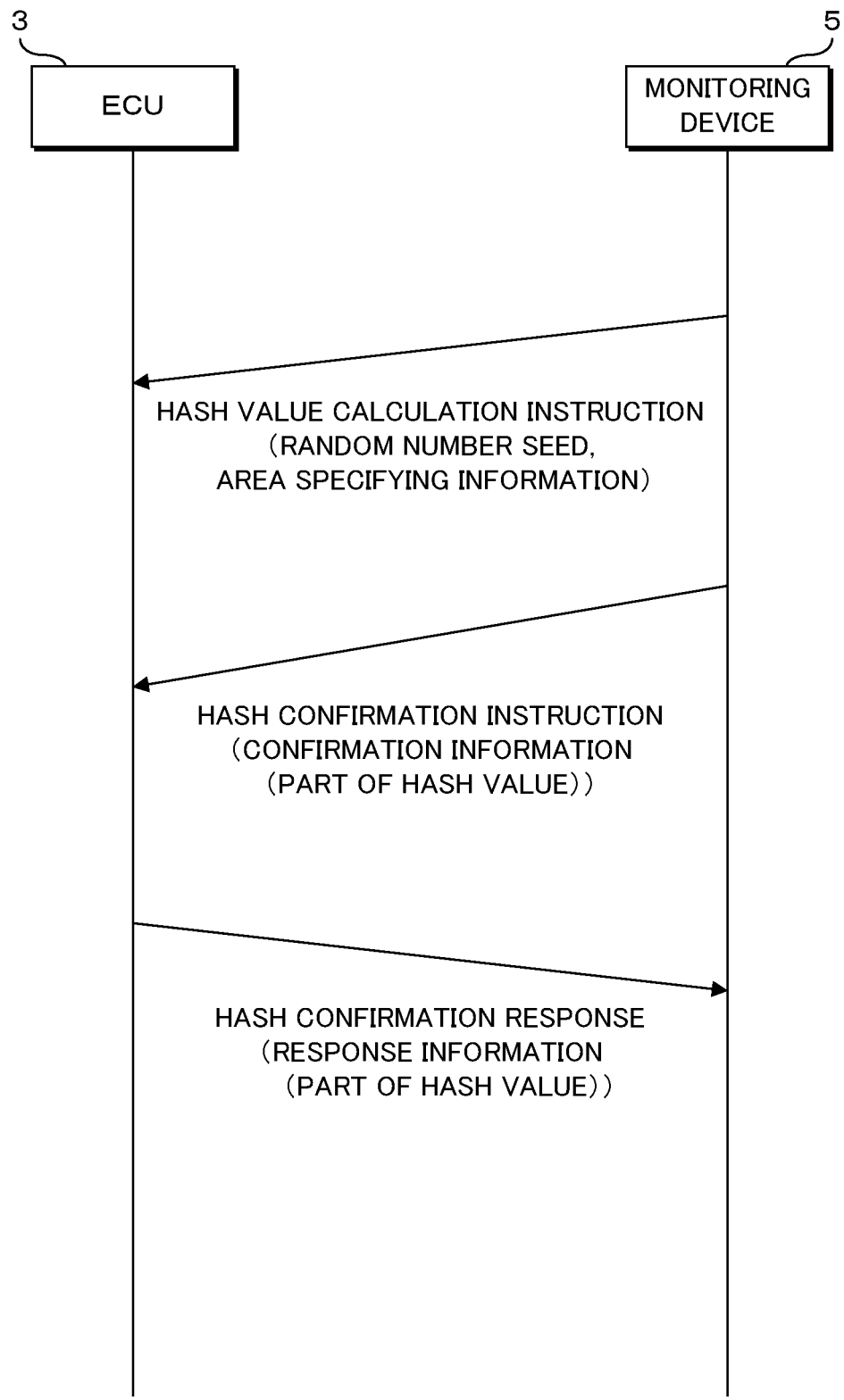
FIG. 6 is a schematic view for explaining illegal falsification detection processing and shared key generation processing to be performed by a monitoring device and an ECU.
Figure 7:
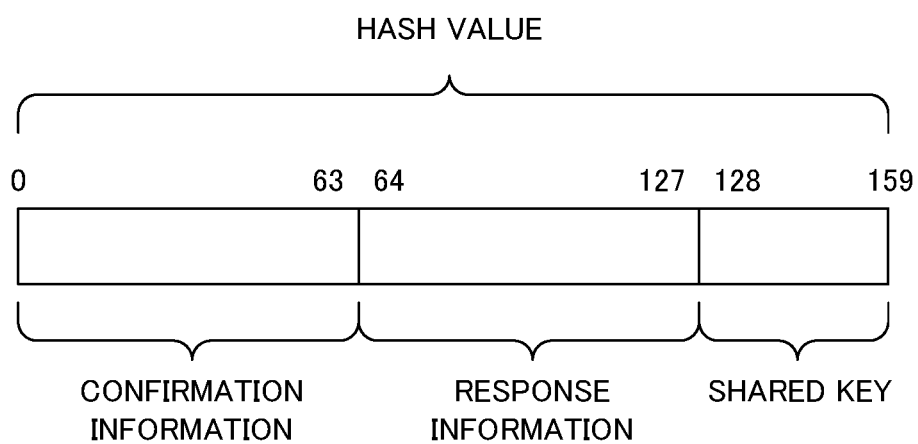
FIG. 7 is a schematic view for explaining illegal falsification detection processing and shared key generation processing to be performed by a monitoring device and an ECU.

FIGS. 6 and 7 are schematic views for explaining illegal falsification detection processing and shared key generation processing to be performed by the monitoring device 5 and an ECU 3. It is to be noted that FIG. 6 illustrates the procedures of transmission and reception of information between the monitoring device 5 and the ECU 3, while FIG. 7 illustrates the structure of a hash value to be calculated. In the illegal falsification detection processing and shared key generation processing, the monitoring device 5 first generates information to be used for hash value calculation. In this embodiment, the monitoring device 5 generates a random number seed and area specifying information. The processing unit 51 of the monitoring device 5 regards data having a predetermined bit length, which is obtained by generating a random number according to a predetermined algorithm, as a random number seed. The area specifying information is information which specifies an area in the ROM 32, which is the object of hash value calculation, and is information such as the start address and the end address, or the start address and the data size, for example. The processing unit 51 can decide the start address on the basis of a random number, for example, and regard what is obtained by adding a predetermined number to the start address as an end address. As another example, the processing unit 51 can regard the start address of the first time as an initial value such as zero, and regard what is obtained by adding a predetermined number to the start address of the last time as the start address of this time for the second time or after.

The processing unit 51 of the monitoring device 5 transmits the generated random number seed and area specifying information to an ECU 3, which is the processing object, together with a hash value calculation instruction. Moreover, the hash value calculation unit 61 of the processing unit 51 reads out the storage content of an ECU 3, which is the processing object, from the copy data 52*a* of the storage unit 52, and calculates a hash value using the read-out storage content and the generated random number seed and area specifying information. The hash value calculation unit 61 extracts a location, which is specified in the area specifying information, from the copied storage content, and calculates a hash value by inputting the extracted storage content and the random number seed into a preset hash function. In this embodiment, the hash value calculation unit 61 is configured to calculate a 160-bit hash value using an SHA-1 hash function. The processing unit 51 stores the hash value calculated by the hash value calculation unit 61 in the storage unit 52.

An ECU 3, which receives the random number seed and the area specifying information from the monitoring device 5, calculates a hash value at the hash value calculation unit 41 of the processing unit 31 using the storage content of the ROM 32 of the ECU 3 itself and the received random number seed and area specifying information. The hash value calculation unit 41 extracts a location, which is specified in the area specifying information, from the ROM 32, and calculates a hash value by inputting the extracted storage content and the random number seed into a preset hash function. The processing unit 31 stores the hash value calculated by the hash value calculation unit 41 in the storage unit 33. It is to be noted that a hash function to be used by the monitoring device 5 and a hash function to be used by the ECU 3 are the same. Hence, a hash value to be calculated by the monitoring device 5 and a hash value to be calculated by the ECU 3 become the same value if the storage content of the copy data 52a and the storage content of the ROM 32 are the same. On the contrary, if the hash values become different values, there is a possibility that the storage content of the ROM 32 of the ECU 3 has been falsified.

Here, a hash value calculation method by the hash value calculation unit 61 of the monitoring device 5 and the hash value calculation unit 41 of an ECU 3 will be described briefly. The hash value calculation units 41 and 61 can be constructed to each calculate a hash value utilizing an existing hash function such as MD (Message Digest) 4, MD 5, SHA-1, SHA-256, SHA-384, SHA-512, EIPEMD-160 or SHA-3, for example. These are so-called one-way hash functions, and are functions which output one hash value for inputted information. Information to be inputted into a hash function is a part or the whole of the program 32a or data 32b stored in the ROM 32 of the ECU 3 in this embodiment. Regardless of whether information to be inputted into a hash function is any one of the program 32a and the data 32b, or both of the program 32a and the data 32b, the hash function treats inputted information simply as binary information, so that a hash value can be calculated. The hash value calculation units 41 and 61 each store a preset hash function, and calculate a hash value using the hash function.

The following description will explain a calculation method of a case where the hash value calculation units 41 and 61 each calculate a hash value using an SHA-1 hash function. It is to be noted that detailed processing of an SHA-1 hash function and, when the hash value calculation units 41 and 61 use other hash functions, the hash functions are existing technique, and therefore explanation thereof will be omitted.

In a case where an SHA-1 hash function is utilized, the hash value calculation units 41 and 61 first perform padding processing. In padding processing, the hash value calculation units 41 and 61 adjust the size of information, which is the processing object, to be an integral multiple of a predetermined value (512 bit) by adding extra data after inputted information. The hash value calculation units 41 and 61 then perform first processing to divide the padded information into 512-bit blocks and calculate eighty values for each block.

Then, the hash value calculation units 41 and 61 each perform second processing to perform an arithmetic operation for an initial value having a predetermined size (160 bit) using a value calculated in the first processing and regard a 160-bit value obtained after the arithmetic operation as a hash value. First in the second processing, the hash value calculation units 41 and 61 each perform an 80-step arithmetic operation using the eighty values, which are calculated for one block, for a 160-bit initial value. With the 80-step arithmetic operation, it is possible to mix block information into the 160-bit initial value, and a 160-bit value is obtained as an output. The hash value calculation units 41 and 61 each perform an 80-step arithmetic operation similarly using eighty values, which are calculated for the next block, as an initial value of the obtained 160-bit value. The hash value calculation units 41 and 61 each perform similar 80-step processing for all blocks so as to finally obtain a 160-bit value as a hash value.

Moreover, in this embodiment, the hash value calculation units 41 and 61 need to calculate a hash value utilizing a random number seed generated by the monitoring device 5. For example, the hash value calculation units 41 and 61 can use a random number seed for data to be added to inputted information in the padding processing. As another example, the hash value calculation units 41 and 61 can use a random number seed for a 160-bit initial value in the second processing. In this embodiment, a random number seed is used for an initial value of the second processing.

It is to be noted that a method of utilizing a random number seed by the hash value calculation units 41 and 61 is not limited to the above method. For example, the hash value calculation units 41 and 61 can regard a logical operation value (e.g., exclusive OR) of the random number seed and the storage content of a ROM 32, which is the object of hash value calculation, as information to be inputted into a hash function. As another example, the hash value calculation units 41 and 61 can regard what is obtained by adding a random number seed to a predetermined position such as a head part or a tail part of the storage content of a ROM 32, which is the object of hash value calculation, as information to be inputted into a hash function.

After finishing transmission of a random number seed and area specifying information to an ECU 3 and hash value calculation by the hash value calculation unit 41, the processing unit 51 of the monitoring device 5 performs processing to extract a part of the calculated hash value at the extraction unit 62. In this embodiment, the extraction unit 62 extracts a 64-bit value from the calculated 160-bit hash value to obtain confirmation information (first part of hash value). In the example illustrated in FIG. 7, 64 bits from 0 to 63 of the 160-bit hash value are extracted as confirmation information. The processing unit 51 transmits a hash confirmation instruction including the confirmation information extracted by the extraction unit 62 to an ECU 3, which is the processing object.

If an ECU 3 receives the hash confirmation instruction from the monitoring device 5, the processing unit 31 of the ECU 3 acquires confirmation information included in the received hash confirmation instruction. The hash value determination unit 42 of the processing unit 31 compares the confirmation information acquired from the monitoring device 5 with a hash value calculated at the hash value calculation unit 41 of the processing unit 31 itself. The hash value determination unit 42 determines whether a part of a hash value acquired from the monitoring device 5 as confirmation information is included in a hash value calculated by the hash value calculation unit 41 or not. If the hash value determination unit 42 determines that the hash value of confirmation information is not included in the hash value of the processing unit 31 itself, it is considered that the hash value calculated by the ECU 3 does not coincide with the hash value calculated by the monitoring device 5, and therefore the processing unit 31 interrupts the processing and gives error notification or the like to the monitoring device 5.

If the hash value determination unit 42 determines that the hash value of confirmation information is included in the hash value of the processing unit 31 itself, the hash value calculated by the ECU 3 is regarded as the same value as the hash value calculated by the monitoring device 5, and the processing unit 31 performs processing to transmit a response (hash confirmation response) to the hash confirmation instruction to the monitoring device 5. At this time, the extraction unit 43 of the processing unit 31 further extracts 64-bit information from a part of the 160-bit hash value, which is calculated by the hash value calculation unit 41, other than 64 bits corresponding to the confirmation information. In the example illustrated in FIG. 7, the extraction unit 43 extracts 64-bit information, which follows the confirmation information from the monitoring device 5, as response information (second part of hash value). The processing unit 31 transmits the 64-bit response information, which is extracted by the extraction unit 43, including the hash confirmation response to the monitoring device 5. It is to be noted that a method of extracting confirmation information and response information from a hash value is not limited to the method illustrated in FIG. 7. For example, confirmation information and response information may overlap partially.

If the monitoring device 5 receives a hash confirmation response from the ECU 3, the processing unit 51 of the monitoring device 5 acquires response information included in the received hash confirmation response. The hash value determination unit 63 of the processing unit 51 compares the response information acquired from the ECU 3 with a hash value calculated by the hash value calculation unit 61 of the processing unit 51 itself. The hash value determination unit 63 determines whether a part of a hash value acquired from the ECU 3 as response information is included in a part of a hash value, which is calculated by the hash value calculation unit 61, other than the confirmation information extracted by the extraction unit 62 or not. If the hash value determination unit 63 determines that a hash value of response information is not included in a hash value of the processing unit 51 itself, it is considered that the hash value calculated by the monitoring device 5 does not coincide with the hash value calculated by the ECU 3, and therefore the processing unit 51 interrupts the processing and transmits error notification or the like to the ECU 3.

If the hash value determination unit 63 determines that the hash value of response information is included in the hash value of the processing unit 51 itself, the processing unit 51 regards the hash value calculated by the monitoring device 5 as the same value as the hash value calculated by the ECU 3. At this time, the processing unit 51 may notify the ECU 3 of success in determination of a hash value. The key generation unit 64 of the processing unit 51 generates a shared key, which is to be used for cryptograph processing in communication with the ECU 3, on the basis of the hash value calculated by the hash value calculation unit 61, the confirmation information extracted by the extraction unit 62, and the response information acquired from the ECU 3. The processing unit 51 stores the shared key generated by the key generation unit 64 in the storage unit 52, for example. In the example illustrated in FIG. 7, 32-bit information, which is obtained by removing 64 bits of confirmation information and 64 bits of response information from the 160-bit hash value calculated by the hash value calculation unit 61, is regarded as a shared key.

Similarly, the key generation unit 44 of the ECU 3 regards 32-bit information, which is obtained by removing 64-bit information received from the monitoring device 5 as confirmation information and 64-bit information extracted by the extraction unit 43 as response information from the 160-bit hash value calculated by the hash value calculation unit 41 of the ECU 3 itself, as a shared key. The processing unit 31 stores the shared key generated by the key generation unit 44 in the storage unit 33, for example. This allows the ECU 3 and the monitoring device 5 to share 32-bit key information. It is to be noted that key information is not limited to the one illustrated in FIG. 7. For example, the confirmation information and the response information may overlap partially.

Thereafter, the ECU 3 and the monitoring device 5 make communication using the shared key generated in the above procedures. It is to be noted that communication using a shared key is existing technique, and therefore detailed explanation thereof will be omitted. For example, the processing unit 31 of the ECU 3 encrypts information, which is to be transmitted to the monitoring device 5, at the cryptograph processing unit 45 using the shared key, and gives the encrypted information to the CAN communication unit 34 to transmit the information to the monitoring device 5. The processing unit 51 of the monitoring device 5 decrypts the information, which is received from the ECU 3, at the cryptograph processing unit 65. Alternatively, in the processing unit 31 of the ECU 3, for example, the cryptograph processing unit 45 generates authentication information on the basis of the shared key and the information to be transmitted to the monitoring device 5, and transmits transmission information to the monitoring device 5 after attaching the generated authentication information to the transmission information. The processing unit 51 of the monitoring device 5 determines whether authentication information, which is attached to receipt information from the ECU 3, is valid or not using the shared key, and performs processing using the receipt information if the authentication information is valid.

<Update of Shared Key>

If communication using the same shared key is repeatedly made between an ECU 3 and the monitoring device 5, a malicious device which intercepts the communication content is more likely to estimate the shared key. Accordingly, a communication system according to this embodiment performs processing to update a shared key at a predetermined timing. For example, the communication system can be constructed to perform update processing when a shared key is used a predetermined number of times (e.g., 10 or 100). As another example, the communication system can be constructed to perform update processing when the ignition switch of the vehicle 1 is changed from OFF state into ON state. A communication system can also be constructed to perform update processing when some communication error occurs, for example. Shared key update processing may be performed at other timing.

A communication system according to this embodiment provides two types of shared key update processing methods. A first method is to perform shared key generation processing described above from the beginning. That is, at a timing to update a shared key, the monitoring device 5 generates a random number seed and area specifying information, transmits a hash value calculation instruction to the ECU 3, and performs recalculation of a hash value and regeneration of a shared key.

A second method to update a shared key is a method which uses calculated hash values which are respectively stored in the ECU 3 and the monitoring device 5. This method has an advantage that the processing can be performed in a short time, since it is unnecessary to perform processing for calculating a hash value at the ECU 3 or the monitoring device 5. The following description will explain a method to update a shared key utilizing stored hash values.

Figure 8:
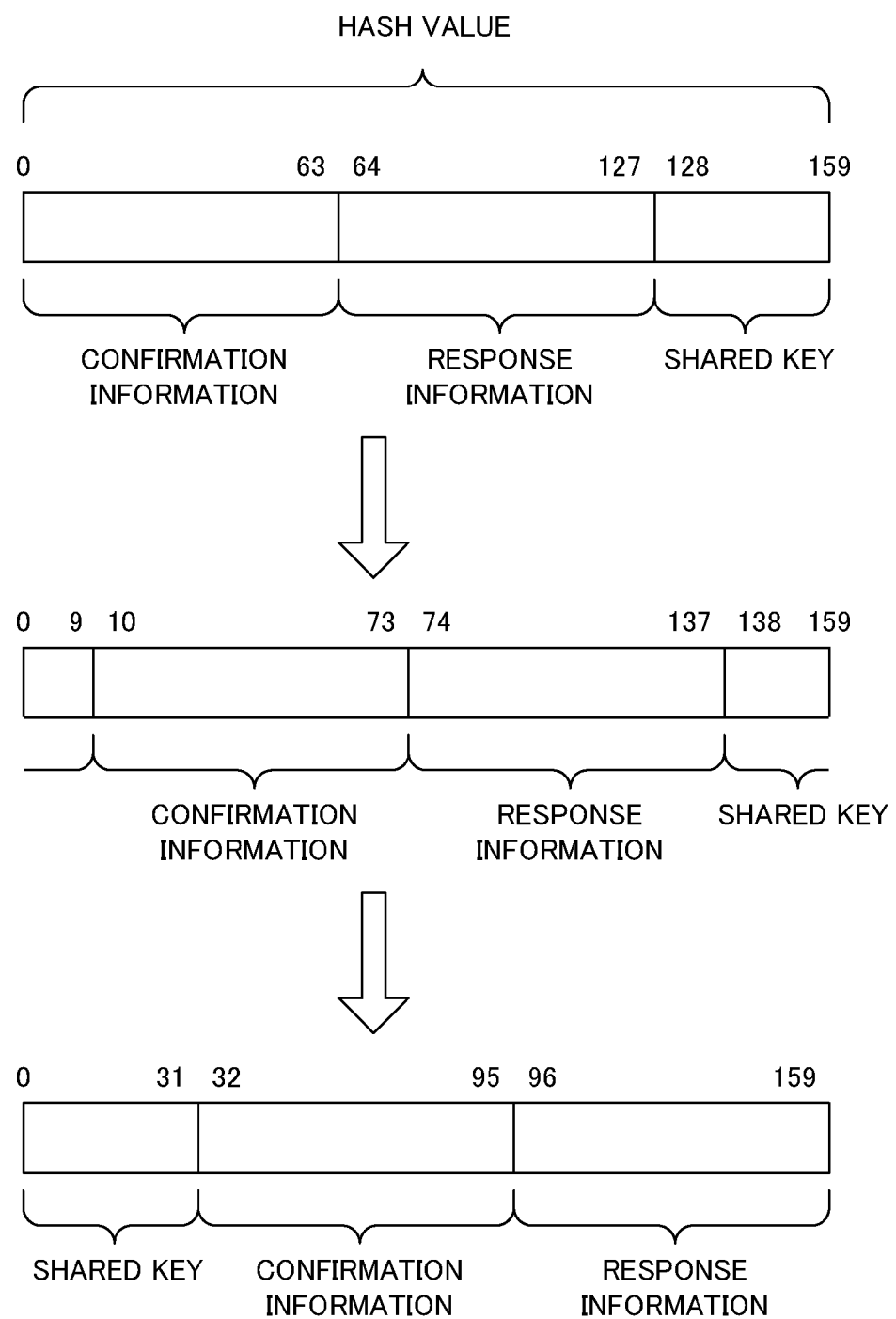
FIG. 8 is a schematic view for explaining shared key update processing.

FIG. 8 is a schematic view for explaining shared key update processing. The ECU 3 stores a hash value 33a, which is calculated in the process of generating a shared key, in the storage unit 33. Similarly, the monitoring device 5 stores a hash value 52b, which is calculated in the process of generating a shared key, in the storage unit 52. The hash value stored in the ECU 3 and the hash value stored in the monitoring device 5 are the same values. Here, the monitoring device 5, which performs shared key generation processing with a plurality of ECUs 3, stores a hash value for each ECU 3. The figure illustrated in the upper part of FIG. 8 is the same as the figure illustrated in FIG. 7, which illustrates a hash value stored in an ECU 3 and the monitoring device 5, a shared key at the moment (before update processing), and the like.

If it becomes necessary to update a shared key, the processing unit 51 of the monitoring device 5 performs, at the extraction unit 62, processing to extract new confirmation information from the hash value 52b stored in the storage unit 52. At this time, the extraction unit 62 extracts confirmation information, which is different from information at the time of shared key generation or update of the last time. Therefore, the monitoring device 5 preferably stores a position from where confirmation information has been extracted (from which bit to which bit of the hash value have been regarded as confirmation information), though it is also possible to identify the extraction position of confirmation information of the last time by examining which part of a stored hash value a current shared key corresponds to.

For example, the extraction unit 62 can generate a random number and regard a position, which is obtained by adding the random number to the extraction position of the last time, as the extraction position of this time. In the example illustrated in the middle part of FIG. 8, 10 bits are added to the extraction position (0-63 bits) of the last time, and 10-73 bits of a stored hash value are extracted as confirmation information. The processing unit 51 of the monitoring device 5 transmits a hash confirmation instruction, which includes 64-bit confirmation information extracted by the extraction unit 62, to an ECU 3. If an ECU 3 receives the hash confirmation instruction, the extraction unit 43 of the ECU 3 extracts response information from the hash value 33a stored in the storage unit 33. In the example illustrated in the middle part of FIG. 8, 74-137 bits following the confirmation information are extracted as response information. The processing unit 31 of the ECU 3 transmits a hash confirmation response, which includes the extracted response information, to the monitoring device 5. This allows the monitoring device 5 and the ECU 3 to obtain new confirmation information and response information, and the monitoring device 5 and the ECU 3 each regard 32-bit information, which is obtained by removing the confirmation information and the response information from the hash value stored in the monitoring device 5 or the ECU 3 itself, as a new shared key. In the example illustrated in the middle part of FIG. 8, 138-159-bit and 0-9-bit information of a hash value is regarded as a shared key.

An example of a case where it further becomes necessary to update a shared key is illustrated in the lower part of FIG. 8. The monitoring device 5 adds 12 bits to the extraction position of the last time, extracts 32-95 bits of a hash value as confirmation information, and transmits the confirmation information to the ECU 3. The ECU 3 extracts 96-159 bits following the confirmation information as response information, and transmits the response information to the monitoring device 5. The monitoring device 5 and the ECU 3 each regard 0-31 bits, which is obtained by removing the confirmation information and the response information from a stored hash value, as a shared key.

As described above, it is possible with a communication system according to this embodiment to update a shared key by reutilizing a calculated hash value and changing the extraction position of confirmation information from a hash value by the monitoring device 5. In the case of this example, it is possible to obtain at least 160 types of shared keys from a 160-bit hash value. It is also possible with a communication system according to this embodiment to obtain more shared keys if the monitoring device 5 changes a random number seed and area specifying information for recalculating a hash value.

<Flowchart>

Figure 9:
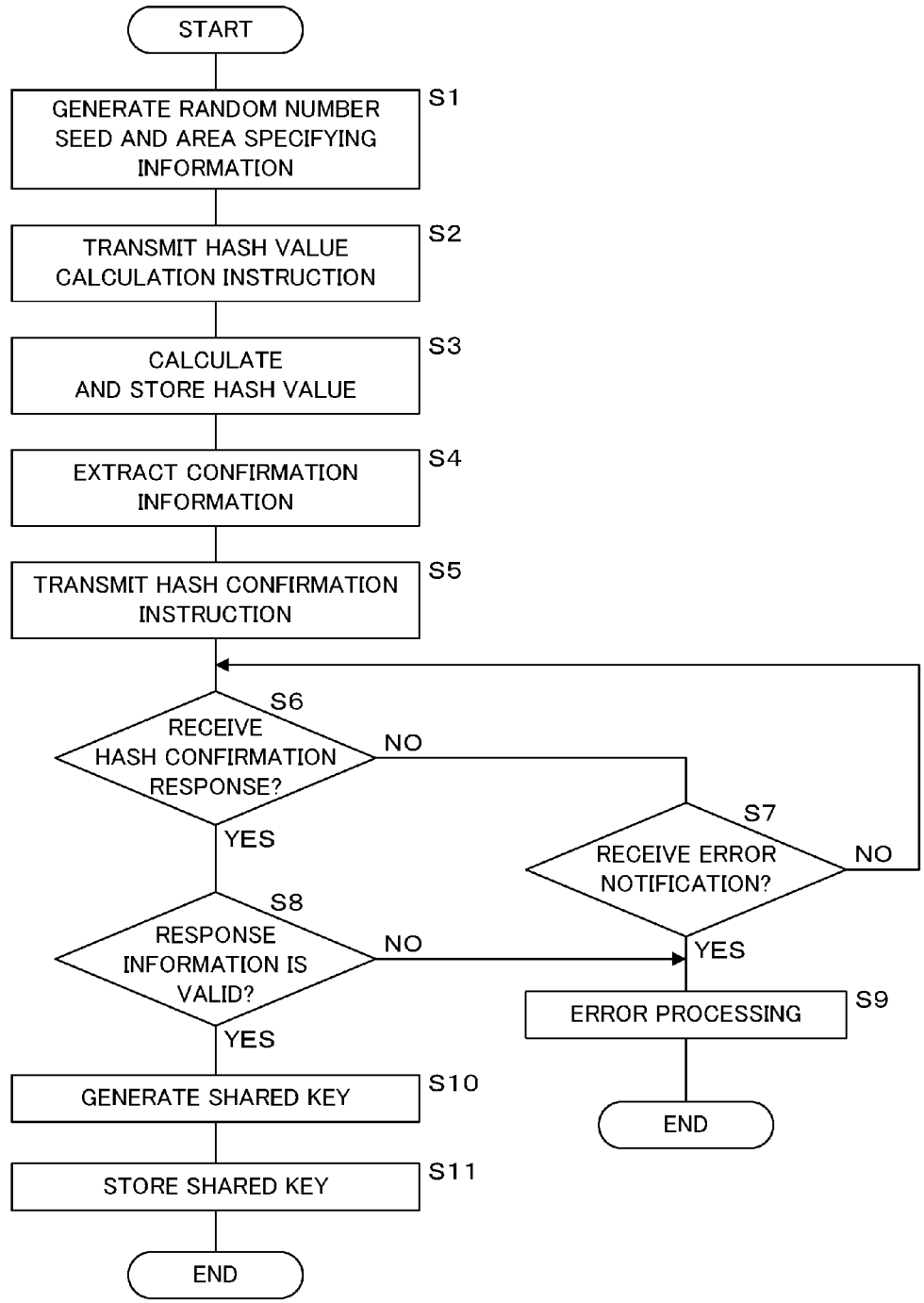
FIG. 9 is a flowchart illustrating the process procedures of illegal falsification detection and shared key generation to be performed by a monitoring device.

The following description will explain processing to be performed by the monitoring device 5 and an ECU 3 of a communication system according to this embodiment using flowcharts. FIG. 9 is a flowchart illustrating the process procedures of illegal falsification detection and shared key generation to be performed by the monitoring device 5. The processing unit 51 of the monitoring device 5 generates a random number seed, which is to be used for hash value calculation, and area specifying information, which specifies a storage area in the ROM 32 of an ECU 3 (step S1). The processing unit 51 transmits a hash value calculation instruction, which includes the generated random number seed and area specifying information, from the CAN communication unit 53 to an ECU 3, which is the processing object (step S2).

The hash value calculation unit 61 of the processing unit 51 acquires copy data 52a of the storage content of the ECU 3, which is the processing object, from the storage unit 52, calculates a hash value using a predetermined hash function on the basis of the acquired copy data 52a and the random number seed and area specifying information generated in step S1, and stores the calculated hash value in the storage unit 52 (step S3). The extraction unit 62 of the processing unit 51 extracts a part from the hash value, which is calculated in step S3, as confirmation information (step S4). The processing unit 51 transmits a hash confirmation instruction, which includes the extracted confirmation information, from the CAN communication unit 53 to the ECU 3, which is the processing object (step S5).

The processing unit 51 then determines whether a hash confirmation response, which is transmitted from the ECU 3 to the hash confirmation instruction, has been received at the CAN communication unit 53 or not (step S6). If a hash confirmation response has not been received (S6: NO), the processing unit 51 determines whether error notification from the ECU, which is the processing object, has been received or not (step S7). If error notification has not been received (S7: NO), the processing unit 51 returns the processing to step S6, and waits until a hash confirmation response or error notification from the ECU 3 is received.

If a hash confirmation response from the ECU 3, which is the processing object, is received (S6: YES), the hash value determination unit 63 of the processing unit 51 determines valid or not valid of response information in accordance with whether response information, which is included in the received hash confirmation response, is included in a hash value calculated in step S3 or not (step S8). If error notification from the ECU 3 is received (S7: YES) or if response information received from the ECU 3 is not valid (S8: NO), the processing unit 51 determines that there is a possibility that the storage content of the ROM 32 of the object ECU 3 has been modified, performs suitable error processing such as stopping the operation of the ECU 3, for example (step S9), and terminates the processing.

If response information received from the ECU 3 is valid (S8: YES), the key generation unit 64 of the processing unit 51 generates a shared key to be used for communication with the ECU 3 (step S10). At this time, the key generation unit 64 obtains a shared key by removing the confirmation information, which is extracted in step S4, and the response information, which is received in step S6, from the hash value calculated in step S3. The processing unit 51 stores the shared key generated by the key generation unit 64 in the storage unit 52 (step S11), and terminates the processing.

Figure 10:
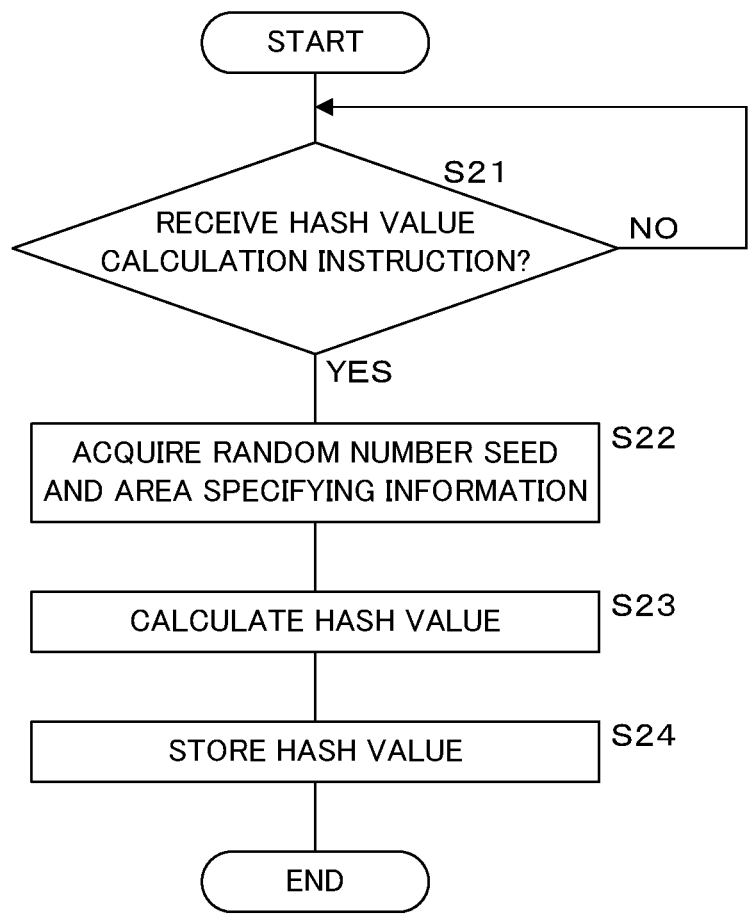
FIG. 10 is a flowchart illustrating the procedures of processing to be performed by an ECU in response to a hash value calculation instruction from a monitoring device.

FIG. 10 is a flowchart illustrating the procedures of processing to be performed by an ECU 3 in response to a hash value calculation instruction from the monitoring device 5. The processing unit 31 of the ECU 3 determines whether a hash value calculation instruction from the monitoring device 5 has been received at the CAN communication unit 34 or not (step S21). If a hash value calculation instruction has not been received (S21: NO), the processing unit 31 waits until a hash value calculation instruction is received. If a hash value calculation instruction is received (S21: YES), the processing unit 31 acquires a random number seed and area specifying information included in the received hash value calculation instruction (step S22). The hash value calculation unit 41 of the processing unit 31 calculates a hash value using a predetermined hash function on the basis of the storage content of the ROM 32, and the random number seed and area specifying information acquired in step S22 (step S23). The processing unit 31 stores the calculated hash value in the storage unit 33 (step S24), and terminates the processing.

Figure 11:
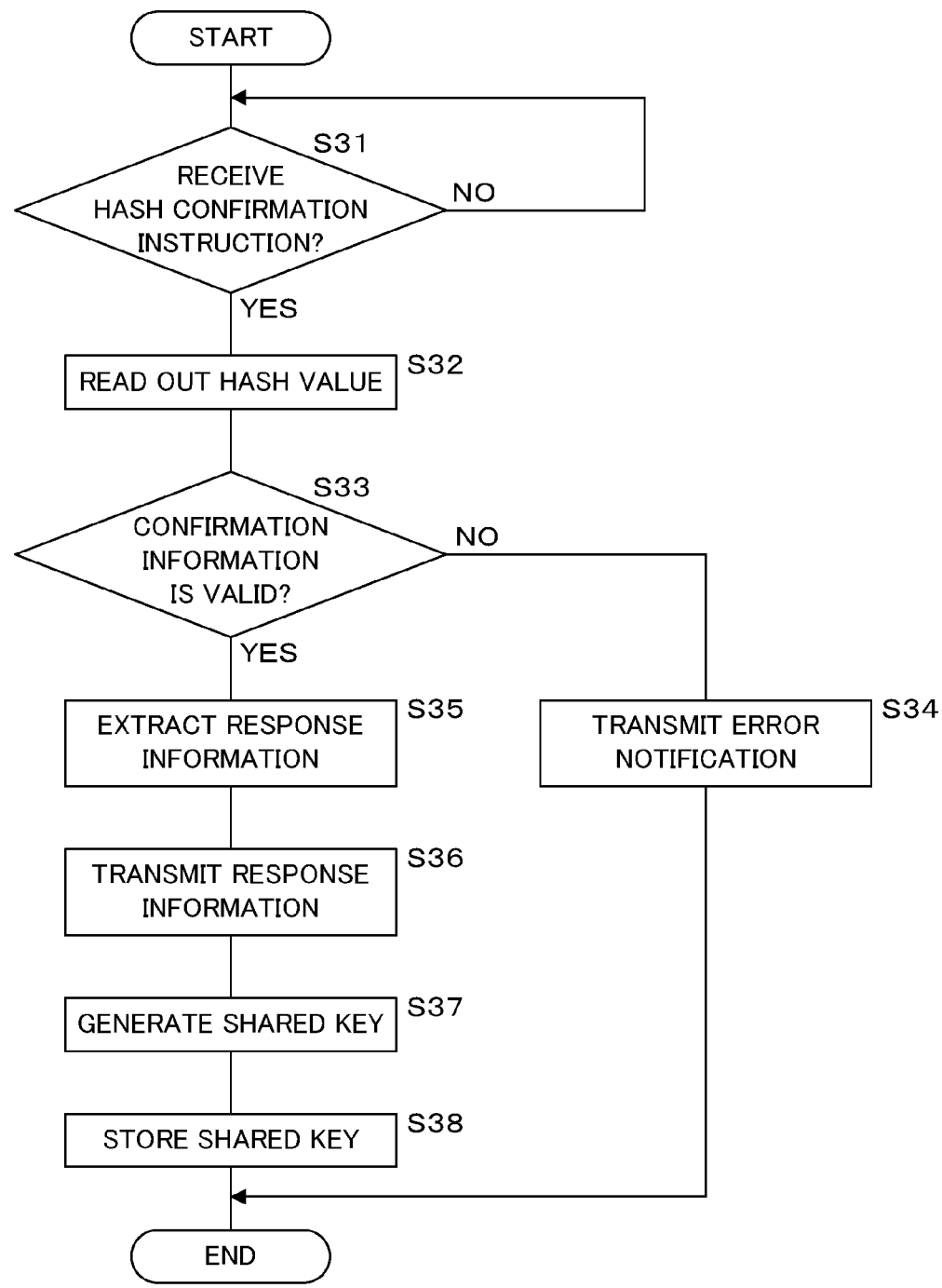
FIG. 11 is a flowchart illustrating the procedures of processing to be performed by an ECU in response to a hash confirmation instruction from a monitoring device.

FIG. 11 is a flowchart illustrating the procedures of processing to be performed by an ECU 3 in response to a hash confirmation instruction from the monitoring device 5. It is to be noted that this processing is common to a case where a shared key is generated first and a case where a shared key is updated. The processing unit 31 of the ECU 3 determines whether a hash confirmation instruction from the monitoring device 5 has been received at the CAN communication unit 34 or not (step S31). If a hash confirmation instruction has not been received (S31: NO), the processing unit 31 waits until a hash confirmation instruction is received. If a hash confirmation instruction is received (S31: YES), the processing unit 31 reads out the hash value 33a stored in the storage unit 33 (step S32). The hash value determination unit 42 of the processing unit 31 determines valid or not valid of the confirmation information, which is included in the hash confirmation instruction received in step S31, in accordance with whether the confirmation information is included in the hash value read out in step S32 or not (step S33). If the confirmation information is not valid (S33: NO), the processing unit 31 transmits error notification to the monitoring device 5 (step S34), and terminates the processing.

If the confirmation information from the monitoring device 5 is valid (S33: YES), the extraction unit 43 of the processing unit 31 extracts response information from a part of the hash value, which is read out in step S32, other than the confirmation information (step S35). The processing unit 31 transmits the extracted response information from the CAN communication unit 34 to the monitoring device 5 (step S36). The key generation unit 44 of the processing unit 31 generates a shared key to be used for communication with the monitoring device 5 (step S37). At this time, the key generation unit 44 obtains a shared key by removing the confirmation information, which is received in step S31, and the response information, which is extracted in step S35, from the hash value read out in step S32. The processing unit 31 stores the shared key generated by the key generation unit 44 in the storage unit 33 (step S38), and terminates the processing.

Figure 12:
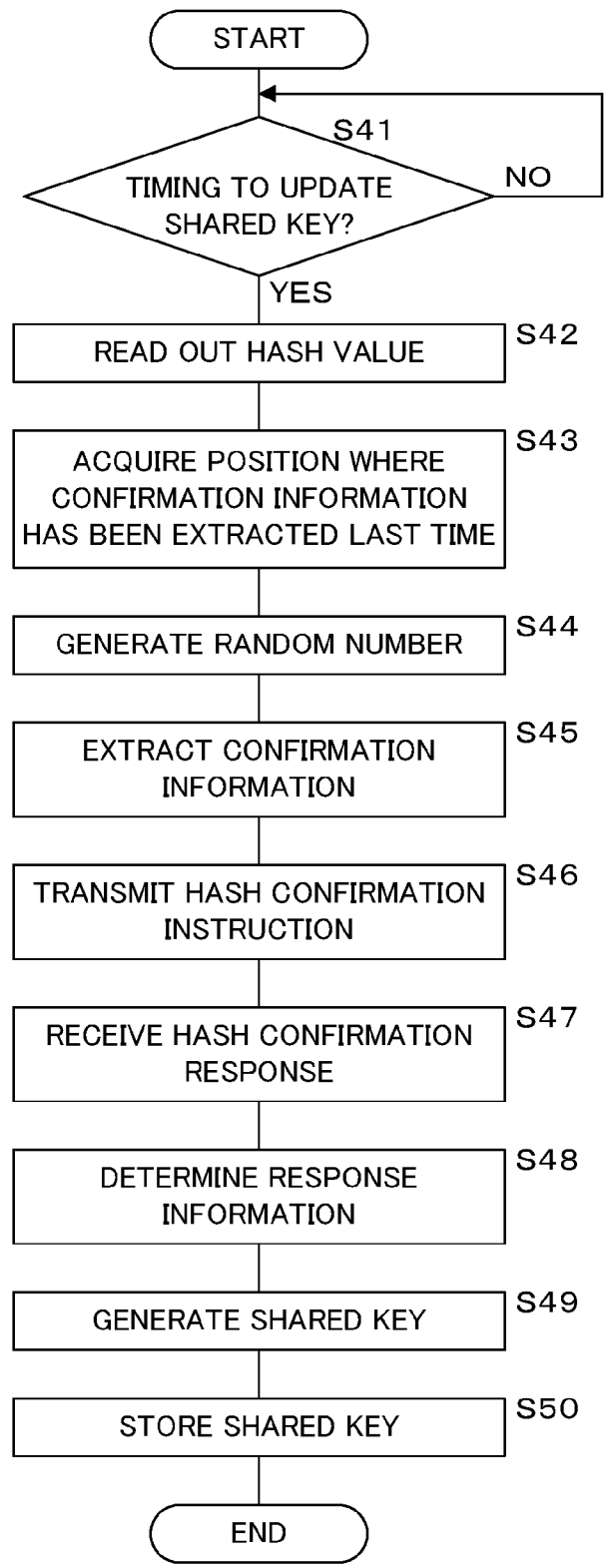
FIG. 12 is a flowchart illustrating the procedures of shared key update processing to be performed by a monitoring device.

FIG. 12 is a flowchart illustrating the procedures of shared key update processing to be performed by the monitoring device 5. The processing unit 51 of the monitoring device 5 determines whether it has reached to a timing to update a shared key, such as when the shared key is utilized a predetermined number of times, or not (step S41). If it has not reached a timing to update a shared key (S41: NO), the processing unit 51 waits for a timing to update a shared key. If it reaches a timing to update a shared key (S41: YES), the processing unit 51 reads out the hash value 52b stored in the storage unit 52 (step S42).

The extraction unit 62 of the processing unit 51 then acquires a position in the hash value from where confirmation information has been extracted last time (step S43). The extraction unit 62 may acquire the position by storing an extraction position of the last time in the storage unit 52 or the like, or may acquire the extraction position by comparing the hash value with the current shared key. The extraction unit 62 generates a random number (step S44), calculates a position by adding the random number to the extraction position of the last time, and extracts confirmation information from a corresponding position of the hash value read out in step S42 (step S45).

The processing unit 51 transmits a hash confirmation instruction, which includes the confirmation information extracted by the extraction unit 62, to an ECU 3, which is the processing object (step S46). It is to be noted that the following processing is the same as steps S6 to S11 in the flowchart illustrated in FIG. 9, though FIG. 12 illustrates the procedures of these processing in a simplified manner. The processing unit 51 receives the hash confirmation response, which is transmitted from the ECU 3 to the hash confirmation instruction (step S47). The hash value determination unit 63 of the processing unit 51 determines whether response information included in the received hash confirmation response is valid or not (step S48). The key generation unit 64 of the processing unit 51 generates a new shared key on the basis of the hash value, which is read out in step S42, the confirmation information, which is extracted in step S45, and the response information, which is determined to be valid in step S48 (step S49), stores the generated shared key in the storage unit 52 (step S50), and terminates the processing.

CONCLUSION

In a communication system according to this embodiment having the above configuration, an ECU 3 and the monitoring device 5 share key information and make communication using the key information. Each ECU 3 has the hash value calculation unit 41 for calculating a hash value on the basis of the storage content of the ROM 32. The monitoring device 5 preliminarily stores copy data 52a of the storage content of the ROM 32 of the ECU 3 in the storage unit 52, and has the hash value calculation unit 61 for calculating a hash value on the basis of the copied storage content. The hash value calculation unit 41 of the ECU 3 and the hash value calculation unit 61 of the monitoring device 5 are constructed to perform arithmetic operations using the same hash function, so that hash values to be calculated become the same value if information to be inputted are the same.

The monitoring device 5 calculates a hash value based on the copy data 52a, regards a part thereof as confirmation information, and transmits the confirmation information to the ECU 3. The ECU 3 compares the part of a hash value, which is received from the monitoring device 5 as confirmation information, with a hash value calculated by the ECU 3 itself, and determines whether the received part of a hash value is included in the hash value of the ECU 3 itself or not. If the received part of a hash value is not included in the hash value of the ECU 3 itself, which means that the copy data 52a of the monitoring device 5 does not coincide with the storage content of the ROM 32 of the ECU 3, it can be determined that there is a possibility that illegal falsification has been made to the storage content of the ROM 32 of the ECU 3. If the received part of a hash value is included in the hash value of the ECU 3 itself, the ECU 3 further extracts a part from a value, which is obtained by removing the confirmation information from the hash value calculated by the ECU 3 itself, and transmits the part to the monitoring device 5 as response information.

The monitoring device 5 compares a part of a hash value, which is received from the ECU 3 as response information, with a hash value calculated by the monitoring device 5 itself, and determines whether the received part of a hash value is included in the hash value of the monitoring device 5 itself or not. If the received part of a hash value is not included in the hash value of the monitoring device 5 itself, it can be determined that there is a possibility that illegal falsification has been made to the storage content of the ROM 32 of the ECU 3. If the received part of a hash value is included in the hash value of the monitoring device 5 itself, which means that the hash value calculated by the ECU 3 coincides with the hash value calculated by the monitoring device 5, it can be determined that illegal falsification has not been made to the storage content of the ROM 32.

The ECU 3 and the monitoring device 5 each calculate a residual value by removing the confirmation information, which is extracted by the monitoring device 5, and the response information, which is extracted by the ECU 3, from the hash value calculated by the ECU 3 or the monitoring device 5 itself, and performs cryptograph processing by sharing the residual value as key information. It is to be noted that the whole of the residual value may be regarded as key information, or a part of the residual value may be regarded as key information. These allow the ECU 3 and the monitoring device 5 to simultaneously perform processing to detect illegal falsification to the storage content of the ROM 32 of the ECU 3 and processing to decide key information to be used for cryptograph processing.

Moreover, in a communication system according to this embodiment, the monitoring device 5 generates a random number seed and area specifying information, and transmits the random number seed and the area specifying information to the ECU 3 as hash value calculation information, prior to hash value calculation. The ECU 3 and the monitoring device 5 each calculate a hash value using the random number seed and the area specifying information. This complicates hash value calculation, and therefore the reliability of detection of illegal falsification to the storage content can be improved, and the reliability of key information to be shared can be improved.

Moreover, in a communication system according to this embodiment, the ECU 3 and the monitoring device 5 each store a calculated hash value. The monitoring device 5 performs key information update processing at a proper timing such as when a predetermined period of time elapses from generation of key information, for example. In update processing, the processing load is reduced by not calculating a new hash value but using a stored hash value. The monitoring device 5 extracts a part, which is different from confirmation information at the time of generation of current key information, from a stored hash value, and transmits the extracted information to the ECU 3 as new confirmation information. Transmission of confirmation information by the monitoring device 5 starts key information update processing. The ECU 3 generates response information on the basis of the received confirmation information and the stored hash value, and transmits the response information to the monitoring device 5. This allows the ECU 3 and the monitoring device 5 to generate new key information on the basis of the stored hash value and the new confirmation information and response information, and update key information.

Although this embodiment has a structure wherein communication between the ECU 3 and the monitoring device 5 is made by wired communication via the CAN bus laid on the vehicle 1, it is to be noted that the present disclosure is not limited to such a structure and may have a structure wherein communication is made by wireless communication such as a wireless LAN. The present disclosure may also have a structure wherein communication is made by wired communication using a protocol other than CAN. Although the monitoring device 5 has a structure wherein the storage unit 52 stores the copy data 52a which is a copy of the storage content of the ROM 32 of the ECU 3, the present disclosure is not limited to such a structure. For example, the present disclosure may have a structure wherein the copy data 52a is stored in another server device or the like and the monitoring device 5 acquires the copy data 52a from the server device as needed, or a structure wherein a server device is provided with a hash value calculation function and the monitoring device 5 acquires a required hash value from the server device. Although this embodiment has been explained using an example of a communication system mounted on a vehicle 1, the present disclosure is not limited to a communication system mounted on a vehicle 1, and a communication system may be mounted on a moving body such as an airplane or a ship, for example, or may be placed not on a moving body but in a factory, an office, a school or the like, for example.

(Variation)

A monitoring device 5 of a communication system according to a variation performs processing to measure time from transmission of a hash confirmation instruction to an ECU 3 to reception of a hash confirmation response from the ECU 3, in addition to the above processing. The monitoring device 5 determines whether the measured time exceeds a threshold or not and, if the measured time exceeds the threshold, determines that illegal rewrite has been performed to the storage content of the ROM 32 of the ECU 3. It is to be noted that the threshold to be used for the determination is preliminarily decided in the design stage of this system or the like, considering the communication speed of the monitoring device 5 and the ECU 3, the throughput of the ECU 3, and the like.

For example, there is a risk that an illegal device is interposed between the monitoring device 5 and an ECU 3 so as to relay and modify information transmitted and received between the monitoring device 5 and the ECU 3. There is another risk that a program 32a and data 32b stored in the ROM 32 of the ECU 3 are compressed and illegal processing is performed by intruding an illegal program into a free space of the ROM 32 formed by the compression, for example. In such a case, it is expected that longer time is required before transmission of a response than a normal state, even when an illegal device, program or the like is constructed to calculate a hash value and make a response to the monitoring device 5. Therefore, a communication system according to this embodiment can prevent illegal processing by an illegal device, program or the like from being performed, by monitoring time as described above.

Embodiment 2

Figure 13:
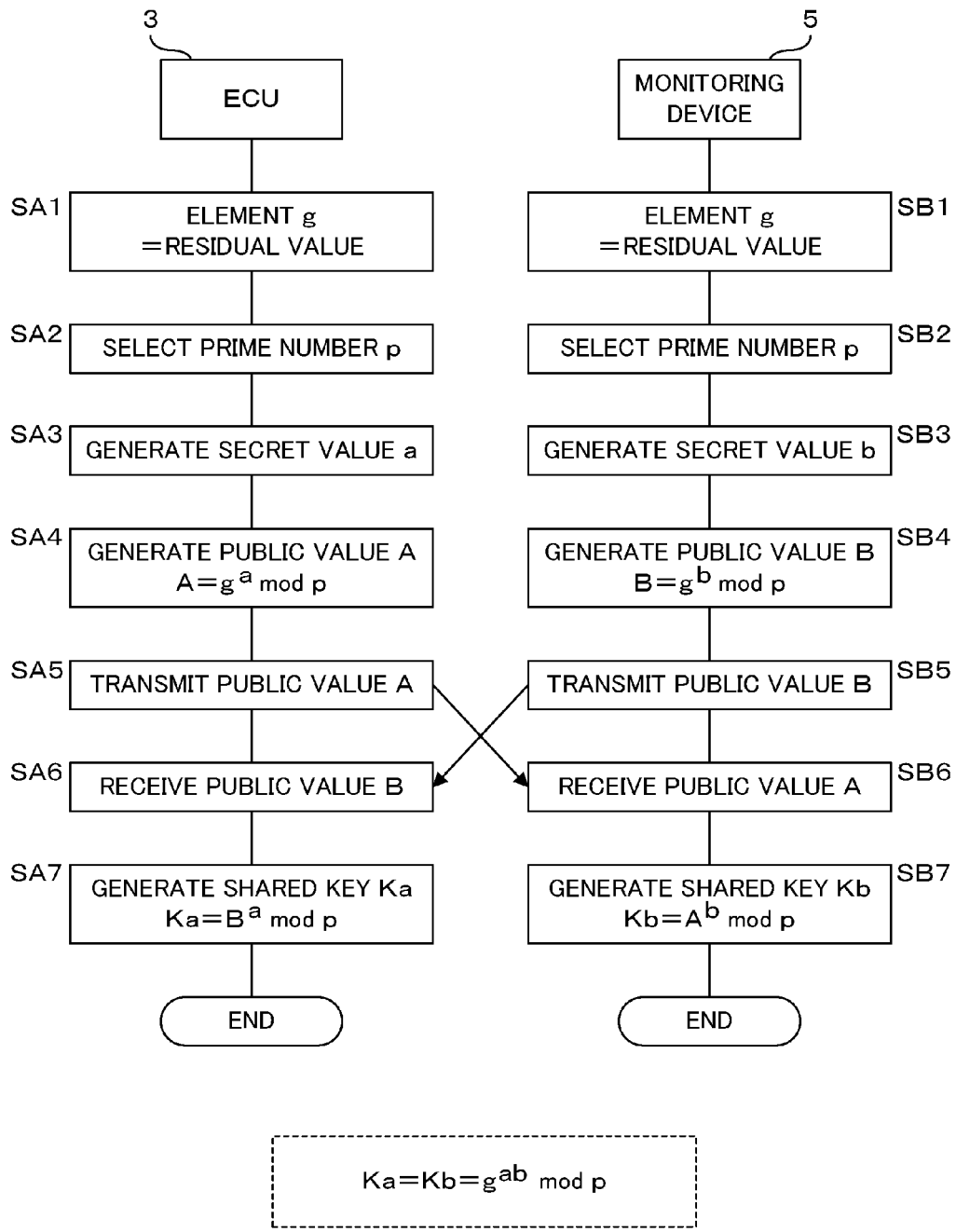
FIG. 13 is a schematic view for explaining a shared key generating method of a communication system according to Embodiment 2.

In a communication system according to Embodiment 2, an ECU 3 and a monitoring device 5 each do not regard a residual value, which is obtained by removing confirmation information and response information from a hash value calculated by the ECU 3 or the monitoring device 5 itself, as a shared key but generate a shared key by further performing an arithmetic operation using the residual value. FIG. 13 is a schematic view for explaining a shared key generating method of a communication system according to Embodiment 2. It is to be noted that this figure illustrates processing which follows: transmission of a hash value calculation instruction and a hash confirmation instruction from the monitoring device 5 to the ECU 3; transmission of a hash confirmation response from the ECU 3 to the monitoring device 5; and calculation of a residual value by each of the ECU 3 and the monitoring device 5 by removing confirmation information and response information from a hash value, which is calculated by the ECU 3 or the monitoring device 5 itself. First in shared key generation processing, the ECU 3 and the monitoring device 5 according to Embodiment 2 each regard a residual value, which is obtained by removing confirmation information and response information from a hash value calculated by the ECU 3 or the monitoring device 5 itself, as an element g (SA1, SB1). Since a hash value calculated by the ECU 3 and a hash value calculated by the monitoring device 5 are the same value, an element g of the ECU 3 and an element g of the monitoring device 5 become the same value.

Then, the ECU 3 and the monitoring device 5 each perform processing to select one prime number p from a preliminarily stored prime number table (SA2, SB2). FIG. 14 is a schematic view illustrating an example of a prime number table. In the prime number table according to this embodiment, 160 large prime numbers from prime number 0 to prime number 159 are stored for 160 labels from 0 to 159. The ECU 3 and the monitoring device 5 each compare a hash value, which is calculated by the ECU 3 or the monitoring device 5 itself, with conformation information extracted by the monitoring device 5, examines the position of confirmation information in the hash value, and examines which bit in the hash value a start bit of confirmation information corresponds to. When confirmation information corresponds to 10-73 bits of a hash value, for example, the ECU 3 and the monitoring device 5 acquire 10, which is the start bit of the confirmation information, and selects prime number 10 corresponding to the label 10 in the prime number table. It is to be noted that the ECU 3 and the monitoring device 5 preliminarily store prime number tables having the same content, so that prime numbers p to be selected become the same value.

The ECU 3 then generates a secret value a (SA3). The secret value a is a value to be utilized only in the ECU 3, and can be generated on the basis of a random number, for example. Similarly, the monitoring device 5 generates a secret value b (SB3). The secret value b is a value to be utilized only in the monitoring device 5, and can be generated on the basis of a random number, for example. The secret value a of the ECU 3 and the secret value b of the monitoring device 5 may be different values.

The ECU 3 then generates a public value A from Expression (1) using the element g, the prime number p and the secret value a (SA4). Similarly, the monitoring device 5 generates a public value B from Expression (2) using the element g, the prime number p and the secret value b (SB4).

$$A = g^a \bmod p \tag{1}$$

$$B = g^b \bmod p \tag{2}$$

The ECU 3 then transmits the calculated public value A to the monitoring device 5 (SA5), and also receives the public value B transmitted form the monitoring device 5 (SA6). Similarly, the monitoring device 5 transmits the calculated public value B to the ECU 3 (SB5), and also receives the public value A transmitted from the ECU 3 (SB6).

The ECU 3 then generates a shared key Ka from Expression (3) using the received public value B, the secret value a and the prime number p (SA7). Similarly, the monitoring device 5 generates a shared key Kb from Expression (4) using the received public value A, the secret value b and the prime number p (SB7). It is to be noted that the shared key Ka generated by the ECU 3 and the shared key Kb generated by the monitoring device 5 become the same value.

$$Ka = B^a \bmod p \tag{3}$$

$$Kb = A^b \bmod p \tag{4}$$

The ECU 3 and the monitoring device 5, which have generated a shared key, store the generated shared key, and perform cryptograph processing using the shared key in the following communication. When shared key update processing is to be performed, the ECU 3 and the monitoring device 5 regenerate a shared key by performing the processing illustrated in FIG. 13.

In a communication system according to Embodiment 2 having the above configuration, the ECU 3 and the monitoring device 5 respectively generate secret values a and b using random numbers, for example, respectively generate public values A and B on the basis of the secret values a and b and the residual values, respectively transmit the public values A and B to each other, and respectively generate key information Ka and Kb on the basis of the secret values a and b of the ECU 3 and the monitoring device 5 themselves and the received public values A and B. Moreover, the ECU 3 and the monitoring device 5 store a common prime number table. The prime number table has a plurality of prime numbers stored therein, and the ECU 3 and the monitoring device 5 each select one prime number in accordance with a start bit position of confirmation information in a hash value. The ECU 3 and the monitoring device 5 respectively generate public values A and B using selected prime numbers.

These can enhance the confidentiality of key information shared by the ECU 3 and the monitoring device 5.

Although this embodiment has a structure wherein secret values a and b are generated on the basis of random numbers, it is to be noted that the present disclosure is not limited to such a structure, and secret values a and b may be generated by any one of various other methods. For example, the present disclosure can have a structure wherein a secret value table having a plurality of secret values stored therein is preliminarily stored as with the prime number table, and one secret value is selected from the secret value table. Moreover, the structure of the prime number table is not limited to the structure illustrated in FIG. 14, and may be any one of various other structures. Moreover, a method to select one prime number from the prime number table is not limited to a method based on the start bit position of confirmation information, and various other methods may be employed.

Since the other configuration of a communication system according to Embodiment 2 is similar to the configuration of a communication system according to Embodiment 1, identical symbols are attached to similar parts, and detailed explanation will be omitted.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A communication system in which a first communication device and a second communication device having a second storage unit share key information to be used for cryptograph processing,
the first communication device comprising:
a first memory;
a first storage unit which stores storage content of the second storage unit of the second communication device;
a first hash value calculation unit stored in the first memory and calculating a first hash value based on storage content of the first storage unit;
a first part extraction unit stored in the first memory and extracting a first part from the first hash value calculated by the first hash value calculation unit; and
a first part transmission unit transmitting the first part extracted by the first part extraction unit to the second communication device,
the second communication device comprising:
a second memory;
a second hash value calculation unit stored in the second memory and calculating a second hash value based on storage content of the second storage unit;
a first part reception unit receiving the first part from the first communication device;
a second hash value determination unit stored in the second memory and determining whether the first part received at the first part reception unit coincides with a part of the second hash value calculated by the second hash value calculation unit or not;
a second part extraction unit stored in the second memory and extracting a second part, which is different from the first part, from the second hash value calculated by the second hash value calculation unit if the second hash value determination unit determines that the first part coincides with a part of the second hash value calculated by the second hash value calculation unit;
a second part transmission unit transmitting the second part extracted by the extraction unit to the first communication device; and
a second generation unit stored in the second memory and generating the key information on the basis of a residual value obtained by removing the first part and the second part from the second hash value calculated by the second hash value calculation unit, and the first communication device further comprising:
a second part reception unit receiving the second part from the second communication device;
a first hash value determination unit stored in the first memory and determining whether the second part received at the second part reception unit coincides with a part of the first hash value calculated by the first hash value calculation unit or not; and
a first generation unit stored in the first memory and generating the key information on the basis of a residual value, which is obtained by removing the first part and the second part from the first hash value calculated by the first hash value calculation unit, if the first hash value determination unit determines that the second part coincides.

2. The communication system according to claim 1, wherein
the first generation unit of the first communication device and the second generation unit of the second communication device each regard the residual value as key information.

3. The communication system according to claim 1, wherein
the first communication device comprises:
a first secret value generation unit stored in the first memory and generating a first secret value;
a first public value generation unit stored in the first memory and generating a first public value on the basis of the first secret value generated by the first secret value generation unit and the residual value;
a first public value transmission unit transmitting the first public value generated by the first public value generation unit to the second communication device; and
a second public value reception unit receiving a second public value from the second communication device,
the first generation unit of the first communication device is constructed to generate the key information on the basis of the second public value received at the second public value reception unit and the first secret value,
the second communication device comprises:
a second secret value generation unit stored in the second memory and generating a second secret value;
a second public value generation unit stored in the second memory and generating the second public value on the basis of the second secret value generated by the second secret value generation unit and the residual value;
a second public value transmission unit transmitting the second public value generated by the second public value generation unit to the first communication device; and
a first public value reception unit receiving the first public value from the first communication device, and
the second generation unit of the second communication device is constructed to generate the key information on the basis of the first public value received at the first public value reception unit and the second secret value.

4. The communication system according to claim 3, wherein
the first communication device and the second communication device each comprise:

a prime number table having a plurality of prime numbers stored therein; and a prime number selection unit stored in each of the first and second memory and selecting a prime number from the prime number table, the first public value generation unit of the first communication device is constructed to generate the first public value using the prime number selected by the respective prime number selection unit, and the second public value generation unit of the second communication device is constructed to generate the second public value using the prime number selected by the respective prime number selection unit.

5. The communication system according to claim 3, wherein the first secret value generation unit and the second secret value generation unit are constructed to generate the first secret value and the second secret value on the basis of a random number.

6. The communication system according to claim 1, wherein the first communication device comprises:
a hash value calculation information generation unit stored in the first memory and generating information to be used for hash value calculation; and
a hash value calculation information transmission unit transmitting the hash value calculation information generated by the hash value calculation information generation unit to the second communication device, the first hash value calculation unit is constructed to calculate the first hash value using the hash value calculation information generated by the hash value calculation information generation unit, the second communication device comprises a hash value calculation information reception unit receiving the hash value calculation information from the first communication device, and the second hash value calculation unit is constructed to calculate the second hash value using the hash value calculation information received at the hash value calculation information reception unit.

7. The communication system according to claim 6, wherein the hash value calculation information generated by the hash value calculation information generation unit includes a random number.

8. The communication system according to claim 6, wherein the hash value calculation information generated by the hash value calculation information generation unit includes information which defines an area in the second storage unit of the second communication device, the second communication device being the object of hash value calculation.

9. The communication system according to claim 1, wherein the first communication device comprises:
a first hash value storage unit for storing the first hash value calculated by the first hash value calculation unit; and
a first update processing unit stored in the first memory and performing processing to update the key information on the basis of the first hash value stored in the first hash value storage unit.

10. The communication system according to claim 9, wherein the first update processing unit extracts the first part from the first hash value stored in the first hash value storage unit by the first extraction unit of the first communication device, transmits the extracted first part from the first part transmission unit to the second communication device, and receives the second part from the second communication device at the second part reception unit to update the residual value.

11. The communication system according to claim 10, wherein the second communication device comprises:
a second hash value storage unit for storing the second hash value calculated by the second hash value calculation unit; and
a second update processing unit stored in the second memory and extracting the second part by the second extraction unit of the second communication device on the basis of the first part transmitted in update processing by the first update processing unit of the first communication device, transmitting the extracted second part from the second part transmission unit to the first communication device, and updating the residual value on the basis of the first part and the second part.

12. A key information sharing method which allows a first communication device and a second communication device having a second storage unit to share key information to be used for cryptograph processing, comprising:

copying storage content of the second storage unit of the second communication device into the first communication device;

calculating, by the first communication device, a first hash value based on the copied storage content;

extracting a first part from the first hash value;

transmitting the first part to the second communication device;

calculating, by the second communication device, a second hash value based on storage content of the second storage unit;

receiving, at the second communication device, the first part from the first communication device;

determining whether the first part coincides with a part of the second hash value or not;

extracting a second part, which is different from the first part, from the second hash value if determined that the first part coincides with a part of the second hash value;

transmitting the second part to the first communication device;

generating key information according to a residual value obtained by removing the first part and the second part from the second hash value;

receiving, at the first communication device, the second part from the second communication device;

determining whether the second part coincides with a part of the first hash value or not; and generating key information according to a residual value obtained by removing the first part and the second part from the first hash value, if determined that the second part coincides with a part of the first hash value.

* * * * *